(12) United States Patent
Sasaki et al.

(10) Patent No.: US 9,988,080 B2
(45) Date of Patent: Jun. 5, 2018

(54) POWER STEERING DEVICE AND CONTROL DEVICE FOR VEHICLE-MOUNTED INSTRUMENT

(71) Applicant: HITACHI AUTOMOTIVE SYSTEMS STEERING, LTD., Hiki-gun, Saitama (JP)

(72) Inventors: Mitsuo Sasaki, Hadano (JP); Takumi Hisazumi, Atsugi (JP)

(73) Assignee: HITACHI AUTOMOTIVE SYSTEMS STEERING, LTD., Saitama (JP)

( * ) Notice: Subject to any disclaimer, the term of this patent is extended or adjusted under 35 U.S.C. 154(b) by 109 days.

(21) Appl. No.: 15/021,880

(22) PCT Filed: Jul. 30, 2014

(86) PCT No.: PCT/JP2014/070023
§ 371 (c)(1),
(2) Date: Mar. 14, 2016

(87) PCT Pub. No.: WO2015/040961
PCT Pub. Date: Mar. 26, 2015

(65) Prior Publication Data
US 2016/0229445 A1    Aug. 11, 2016

(30) Foreign Application Priority Data

Sep. 20, 2013    (JP) ................................ 2013-195889

(51) Int. Cl.
*B62D 5/00*    (2006.01)
*B62D 5/04*    (2006.01)

(52) U.S. Cl.
CPC ............. *B62D 5/049* (2013.01); *B62D 5/046* (2013.01); *B62D 5/0484* (2013.01)

(58) Field of Classification Search
CPC ................................ B62D 5/04; B62D 5/0484
(Continued)

(56) References Cited

U.S. PATENT DOCUMENTS 6,240,349 B1 * 5/2001 Nishimoto ............. B62D 5/049
180/443
7,444,217 B2 * 10/2008 Matsuoka .............. B62D 5/049
701/31.1
(Continued)

FOREIGN PATENT DOCUMENTS

DE    10015225 A1    4/2001
DE    10157666 A1    6/2003
(Continued)

*Primary Examiner* — Thomas G Black
*Assistant Examiner* — Wae L Louie
(74) *Attorney, Agent, or Firm* — Foley & Lardner LLP

(57) ABSTRACT

In a power steering device and a control device for a vehicle-mounted instrument, an abnormality detection accuracy of sensor output signals is increased.

In an electric power steering device and a control device for a vehicle-mounted instrument, judgment for the abnormality of the sensor output signals is carried out by using at least four or more sensor output signals, in which when the sensor output signals satisfy both a first condition (viz., the number of the output signals showing an identical value is the largest) and a second condition (viz., the number is equal to or larger than "n+1") (n=the largest number of the sensor output signals that have a common factor), judgement is so made that the sensor output signals that satisfy the first and second conditions are normal and the other signals are abnormal.

20 Claims, 20 Drawing Sheets

(58) Field of Classification Search
USPC .......... 180/446; 318/400.02, 400.21, 400.22; 701/22, 31.4, 32.7, 32.8, 36, 41
See application file for complete search history.

(56) References Cited

U.S. PATENT DOCUMENTS

| | | | |
|---|---|---|---|
| 8,478,642 B2 * | 7/2013 | Dey ................... | G01C 21/3484 705/14.4 |
| 8,548,734 B2 * | 10/2013 | Barbeau ............ | G01C 21/3617 701/410 |
| 9,141,909 B2 * | 9/2015 | Hisano ................. | B60W 40/06 |
| 2002/0120378 A1 * | 8/2002 | Kawada ............... | B62D 5/0484 701/41 |
| 2013/0245794 A1 | 9/2013 | Ishii et al. | |
| 2013/0289826 A1 * | 10/2013 | Yoshitake ............. | B62D 5/049 701/42 |
| 2013/0289827 A1 * | 10/2013 | Yoshitake ........... | B62D 5/0463 701/42 |
| 2014/0360803 A1 * | 12/2014 | Hori ..................... | B62D 5/0484 180/446 |
| 2016/0200353 A1 * | 7/2016 | Sasaki ................... | B62D 5/049 701/43 |

FOREIGN PATENT DOCUMENTS

| | | |
|---|---|---|
| DE | 10 2004 060 361 A1 | 7/2005 |
| EP | 1 710 652 A1 | 10/2006 |
| EP | 2 042 846 A2 | 4/2009 |
| JP | 2000-137917 A | 5/2000 |
| JP | 2005-186759 A | 7/2005 |
| JP | 2005-231416 A | 9/2005 |
| JP | 2009-073446 A | 4/2009 |
| JP | 2010-149678 A | 7/2010 |
| JP | 2011-000964 A | 1/2011 |
| JP | 2011-158389 A | 8/2011 |
| JP | 2012-159956 A | 8/2012 |
| JP | 2013-121778 A | 6/2013 |
| JP | 2013-205254 A | 10/2013 |

* cited by examiner

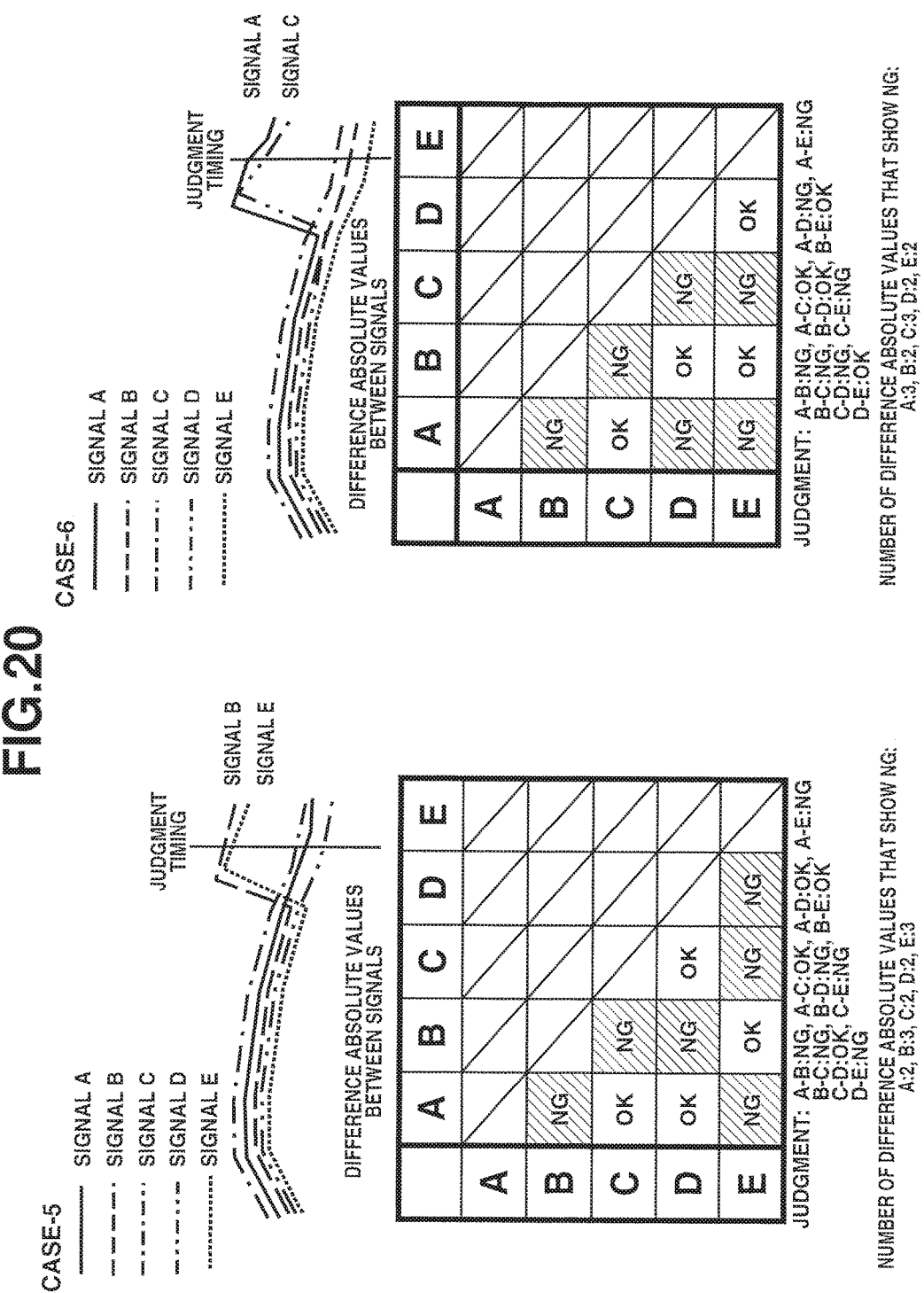

POWER STEERING DEVICE AND CONTROL DEVICE FOR VEHICLE-MOUNTED INSTRUMENT

TECHNICAL FIELD

The present invention relates to a power steering device and a control device for a vehicle-mounted instrument.

BACKGROUND ART

In recent years, further development of commercial value of products has been required with the spread of EPS. In such development, there is a requirement for keeping an assist function in case of a failure even though the assist function has a time limit for operation. For such assistance, there has been proposed a method in which in place of using an abnormal output signal from a sensor, an output signal from the other sensor is practically used as a back-up signal, which is disclosed in Patent Document 1.

PRIOR ART DOCUMENTS

Patent Documents

Patent Document 1: Japanese Laid-open Patent Application (tokkai) 2005-186759.

SUMMARY OF INVENTION

However, if, in case of the above-mentioned method, misjudgment takes place as to which sensor output is abnormal, a heavy burden is applied to the vehicle driver.

As will be understood from the above, in the field of a power steering device and a control device for a vehicle-mounted equipment, it is highly necessary to increase an abnormality detection accuracy to output signals from sensors.

In a power steering device and a control device for a vehicle-mounted instrument according to the present invention, judgment for the abnormality is carried out by using at least four or more sensor output signals, in which when the sensor output signals satisfy both a first condition (viz., the number of the output signals showing an identical value is the largest) and a second condition (viz., the number is equal to or larger than "n+1") (n=the largest number of the sensor output signals that have a common factor), judgement is so made that the sensor output signals that satisfy the first and second conditions are normal and the other signals are abnormal.

According to the present invention, an abnormality detection accuracy of output signals from sensors is increased in a power steering device and a control device for a vehicle-mounted instrument.

BRIEF DESCRIPTION OF DRAWINGS

FIG. 20 shows illustrations that show difference absolute values in cases 5 and 6 in the sixth embodiment.

BEST EMBODIMENTS FOR CARRYING OUT INVENTION

In the following, first to sixth embodiments of the present invention, which are power steering devices and control devices for a vehicle-mounted instrument, will be described in detail with reference to FIGS. 1 to 20.

First Embodiment

Figure 1:
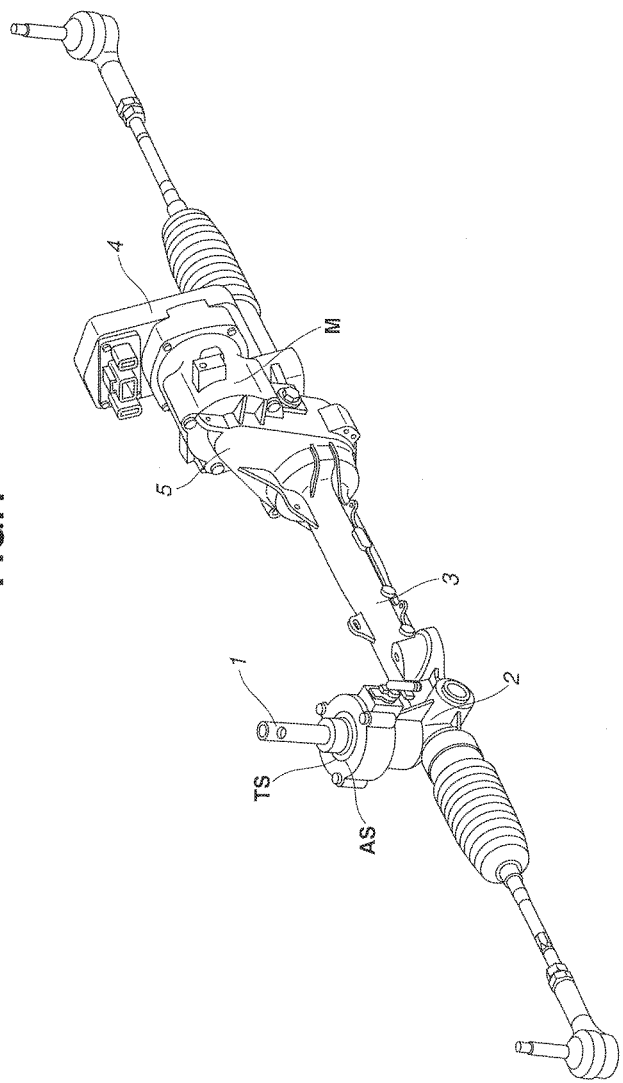
FIG. 1 is a schematic view of a power steering device that is a first embodiment.

FIG. 1 is a schematic view of a power steering device of a first embodiment. In the power steering device shown in FIG. 1, there is employed a basic steering mechanism that comprises a steering wheel (not shown), a steering shaft (steering shaft) 1, a pinion shaft 2 and a rack shaft 3. When, in this steering mechanism, the steering wheel is turned by a driver, a steering torque of the steering wheel is transmitted to the pinion shaft 2 through the steering shaft 1, and at the same time, a rotational movement of the pinion shaft 2 is converted to a linear movement of the rack shaft 3, and thus left and right steered road wheels (not shown) respectively connected to both ends of the rack shaft 3 are steered. That is, the rack shaft 3 is formed with rack teeth with which the pinion shaft 2 is engaged, so that there is constituted a converting mechanism through which turning of the steering shaft 1 is converted to a steering movement with the work of the engagement between the rack teeth and the pinion shaft.

To a housing of the pinion shaft 2, there is mounted a steering torque sensor TS (for example, resolver or the like) that detects a steering angle of the steering wheel, and based on a steering torque detection signal from the steering torque sensor TS, a motor rotation angle detection signal from a motor rotation angle sensor 6 (for example, resolver, IC or the like) that detects a rotation angle of a rotor of an electric motor M and a vehicle speed information, a motor control circuit (not shown) of a control device (which will be named ECU in the following) is operated to control a driving operation of the electric motor M, so that the rack shaft 3 is fed with a steering assist force from the electric motor M through a speed reduction device 5.

To an output shaft of the electric motor M, there is connected the speed reduction device 5 through which the rotation of the electric motor M is converted to the linear movement of the rack shaft 3 while being reduced in speed.

The steering shaft 1 is divided into two parts in an axial direction, which are an input shaft provided for the steering wheel and an output shaft provided for the rack shaft 3. The input shaft and the output shaft are coaxially connected through a torsion bar (not shown). With this torsion bar, the input shaft and the output shaft are rotatable relative to each other due to a torsional deflection of the torsion bar. The steering torque sensor TS is equipped with a Main steering torque sensor that detects a rotation angle of the input shaft side and a Sub steering torque sensor that detects a rotation angle of the output shaft side, and based on output signals from the Main and Sub steering torque sensors, a torsional amount of the torsion bar is calculated for deriving the steering torque.

Furthermore, to the torsion bar, there is connected a steering angle sensor AS (for example, MR element, IC or the like).

Figure 2:
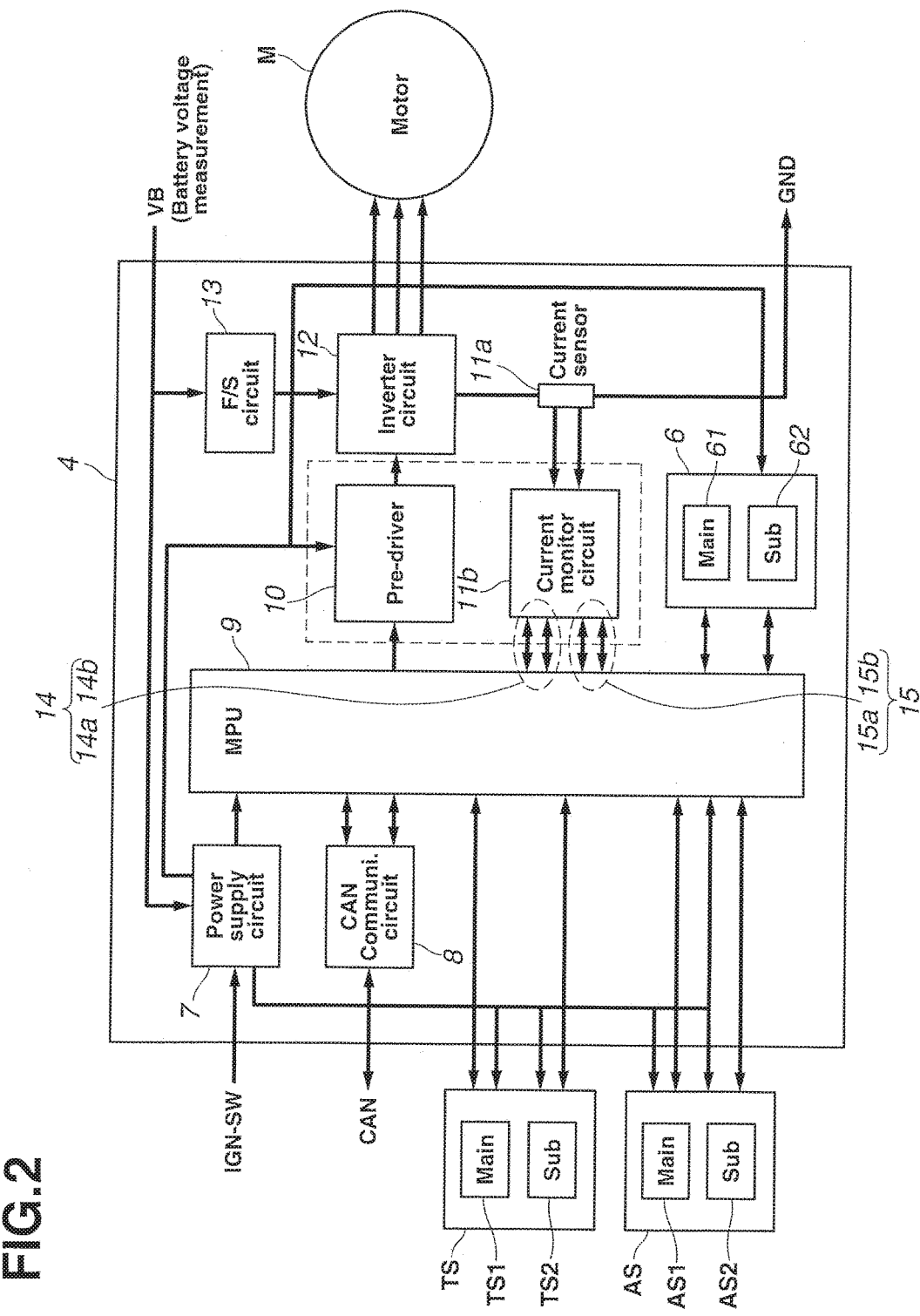
FIG. 2 is an electric system block diagram of the power steering device of the first embodiment.
Figure 3:
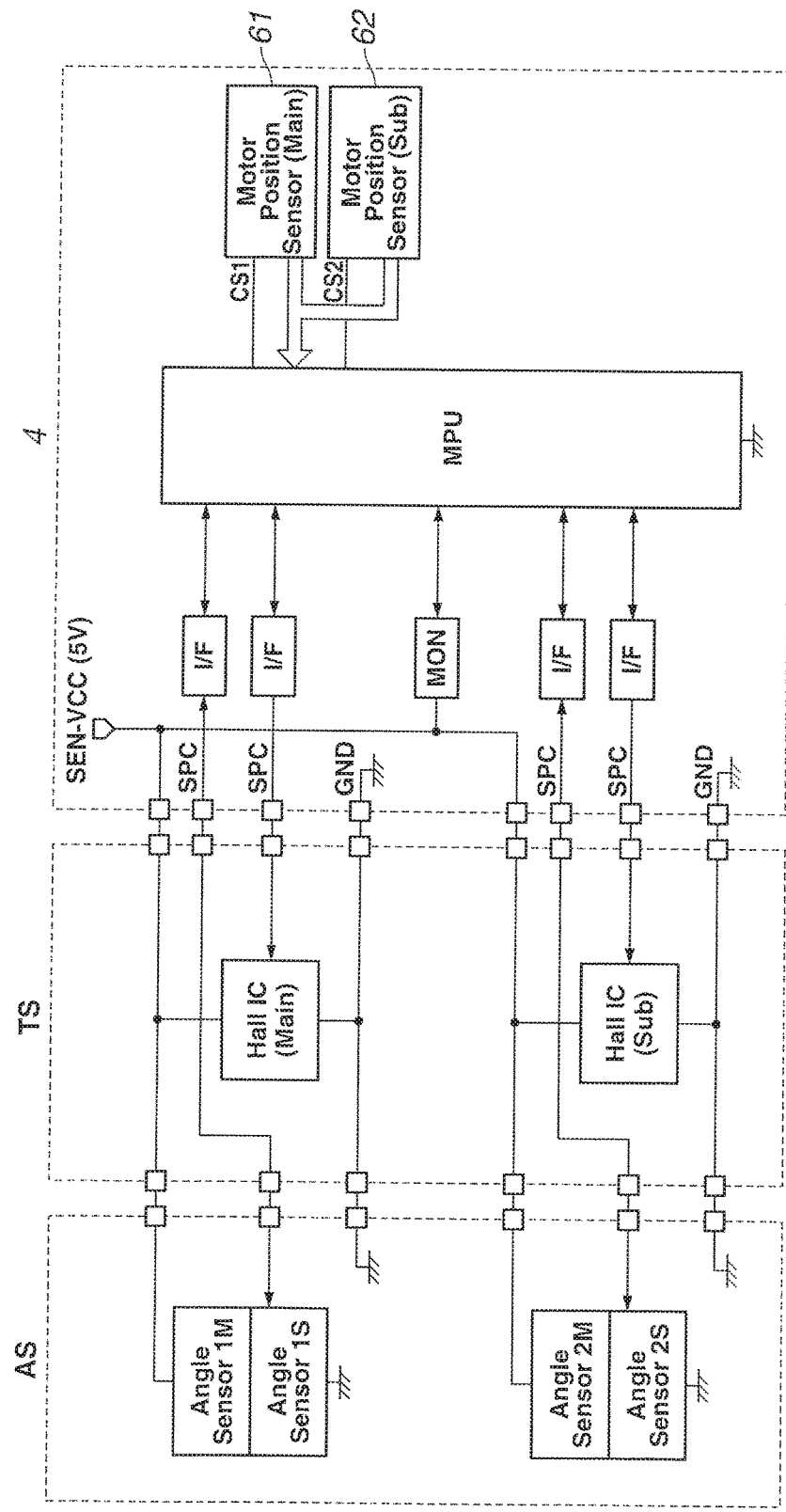
FIG. 3 is a diagram depicting input/output of a steering torque sensor and that of a steering angle sensor.

FIG. 2 is a block diagram showing a construction of the electric system, and FIG. 3 is an illustration depicting input/output of the steering torque sensor TS, the steering angle sensor AS and the motor rotation angle sensor 6. As is seen from FIGS. 2 and 3, by two, viz., Main and Sub steering torque sensors TS1 and TS2, two, viz., Main and Sub steering angle sensors AS1 and AS2 and two, viz., Main and Sub motor rotation angle sensors 61 and 62, the steering torque, the steering angle and the motor rotation angle are detected, and respective steering torque detection signals Tt (Main) and Tt (Sub), respective steering angle detection signals θ s (Main) and θ s (Sub) and respective motor rotation angle detection signals θ m (Main) and θ m (Sub) from the above-mentioned sensors are outputted to a torque signal receiving section (not shown), a steering angle signal receiving section (not shown) and a motor rotation angle signal receiving section (not shown) which are installed in the ECU 4.

An electric power source circuit 7 functions to feed electric power to the sensors, the MPU 9 and ICs. A CAN communication circuit 8 functions to exchange data and information with an associated motor vehicle. The MPU 9 carries out a calculation for an assist control for EPS, a control for a motor current, a detection of abnormality of function constituting elements and a process for shifting a current condition to a safety condition. A fail-safe circuit 13 is so operated that if an abnormality of the MPU 9 is detected thereby needing a shutting down of the system, the circuit 13 shuts down the electric power of the motor current based on a command from the MPU 9.

A drive circuit 10 drives drive elements of an inverter circuit 12 based on a command from the MPU 9. The inverter circuit 12 comprises the drive elements and is operated based on a command from the drive circuit 10. The electric motor M is driven in accordance with a current from the inverter circuit 12, and outputs a motor torque used for the steering assistance. A current flowing in a downstream part of the inverter circuit 12 is detected by a current sensor 11 that is a current detecting element.

In order to carry out a motor control, there are employed Main and Sub current detection circuits 14a and 14b which are applied with a high-response filtering processing. In order to check or monitor overcurrent of the inverter circuit 12, there are employed Main and Sub current detection circuits 15a and 15b which detect an average current and carry out a low-response filtering processing.

Figure 4:
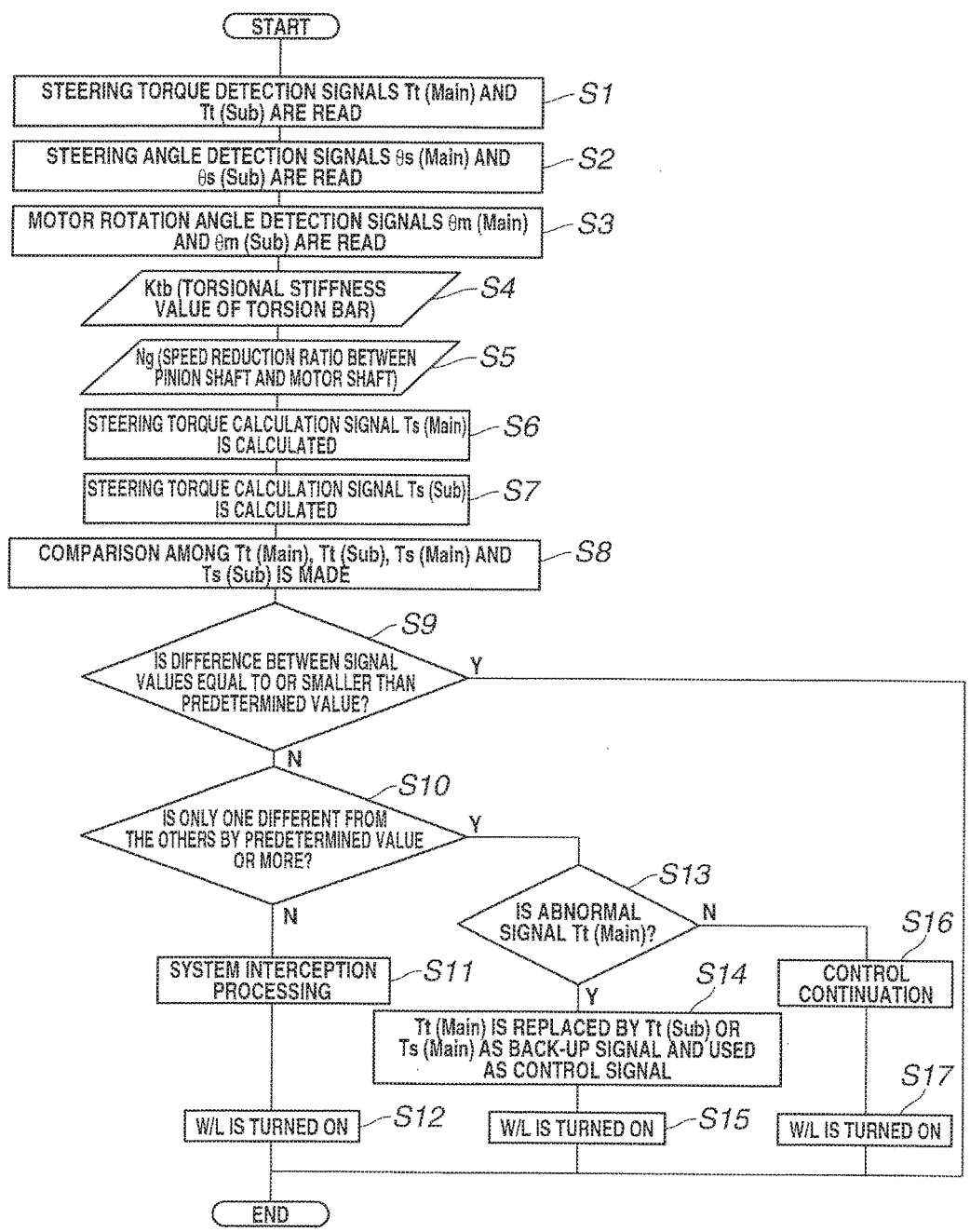
FIG. 4 is a flowchart depicting an abnormal signal detection process employed in the first embodiment.
Figure 5:
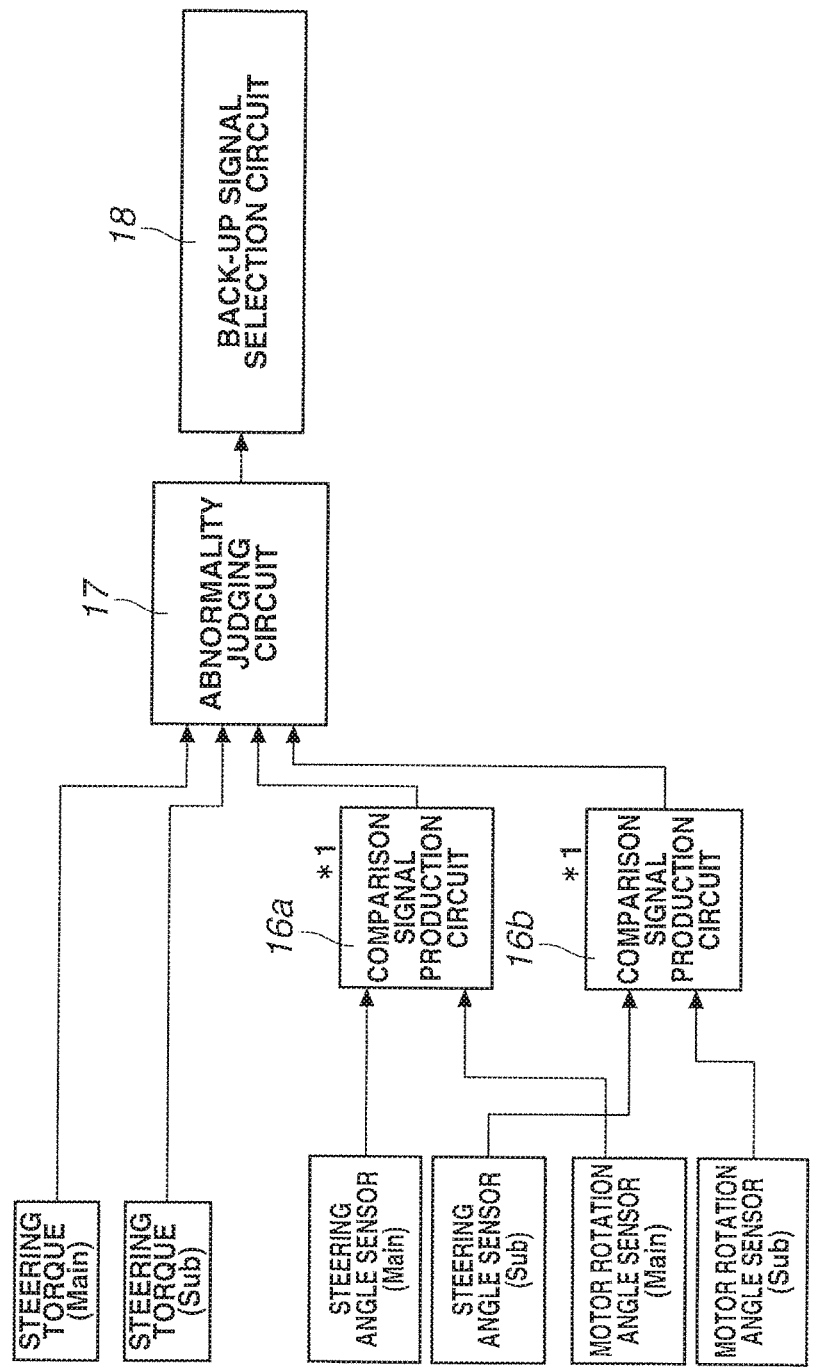
FIG. 5 is a block diagram depicting the abnormal signal detection process employed in the first embodiment.
Figure 6:
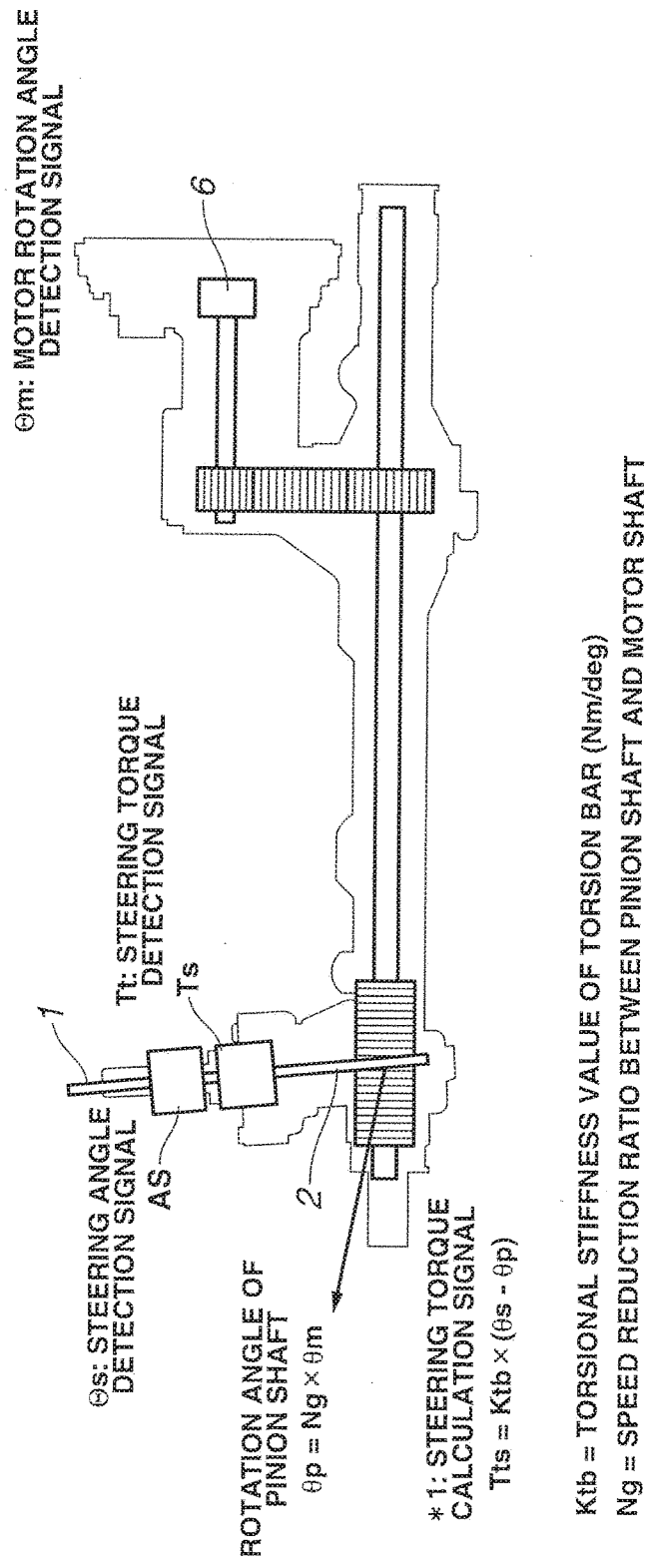
FIG. 6 is an illustration depicting a calculation method of a steering torque calculation signal.

In the following, based on the flowchart of FIG. 4, the block diagram of FIG. 5, and the drawing of FIG. 6 that shows a calculation example for the steering torque calculation signal, an abnormal signal detection process employed in the first embodiment of the invention will be described. In the first embodiment, a case wherein common factors that cause an identical change in output signals from sensors due to common causes are not present will be described.

First, at step S1, sensor output signals which are the steering torque detection signals Tt (Main) and Tt (Sub) respectively issued from the Main and Sub steering torque sensors Ts1 and Ts2 are read, at step S2, steering angle detection signals θ s (Main) and θ s (Sub) respectively issued from the Main and Sub steering angle sensors AS1 and AS2 are read, at step S3, motor rotation angle detection signals θ m (Main) and θ m (Sub) respectively issued from the Main and Sub motor rotation angle sensors 61 and 62 are read, at step S4, a torsional stiffness value Ktb of the torsion bar is read, and at step S5, a reduction ratio Ng between the pinion shaft 2 and the motor shaft is read.

Then, at step S6, by a first comparison signal production circuit 16a, a steering torque calculation signal (Main) is calculated based on the steering angle detection signal θ s (Main), the motor rotation angle detection signal θ m (Main), the torsional stiffness value Ktb of the torsion bar and the reduction ratio between the pinion shaft 2 and the motor shaft.

Now, a method for calculating the steering torque calculation signal Tts (Main) will be explained with reference to FIG. 6. That is, by multiplying a relative angle between upstream and downstream ends of the torsion bar by the torsional stiffness value Ktb of the torsion bar, there is calculated a steering torque calculation signal Tts. The angle of the upstream end of the torsion bar is represented by the steering angle detection signal θ s (Main). While, the angle of the downstream end of the torsion bar (viz., the rotation angle of the pinion shaft 2) is derived by multiplying the motor rotation angle detection signal θ m (Main) by the reduction ratio Ng between the pinion shaft 2 and the motor shaft. That is, the steering torque calculation signal Tts (Main) is represented by the following equation (1).

$$Tts = Ktb \times (\theta s - \theta p) \tag{1}$$

Then, at step S7, by a second comparison signal production circuit 16b, a steering torque calculation signal (Sub) is calculated based on the steering angle detection signal θ s (Sub), the motor rotation angle detection signal θ m (Sub), the torsional stiffness value Ktb of the torsion bar and the speed reduction ratio Ng between the pinion shaft 2 and the motor shaft. Method of calculating the steering torque calculation signal Tts (Sub) is the same as that of the steering torque calculation signal Tts (Main).

At step S8, by an abnormality detection circuit 17, a comparison among the steering torque detection signal Tt (Main), the steering torque detection signal Tt (Sub), the steering torque calculation signal Tts (Main) and the steering torque calculation signal Tts (Sub) is carried out for deriving difference absolute values. That is, the steering torque detection signal Tt (Main), the steering torque detection signal Tt (Sub), the steering torque calculation signal Tts (Main) and the steering torque calculation signal Tts (Sub) are subjected to one-to-one comparison for calculating respective difference absolute values.

At step S9, by the abnormality judgment circuit 17, judgment is carried out as to whether each difference absolute value between the signals is equal to or smaller than a threshold value or not. When all of the difference absolute values between the signals are smaller than the threshold value, the processing of the current control period is finished judging that there is no abnormality, and when some of the difference absolute values are larger than the threshold value, the operation flow goes to step S10.

At step S10, by the abnormality judgment circuit 17, judgement is carried out as to whether judgment for normality/abnormality of each signal is possible or not. If the signal fulfills the following two, viz., first and second conditions, the abnormality judgment circuit 17 judges that the signal is normal and other signals are abnormal.

First condition=The number of the signals that show an identical value is the largest Second condition=The number of the signals that show an identical value is represented by n+1

It is to be noted that "n" represents the number of signals of a group to which the maximum number of signals having common factors belong.

In the first embodiment, there are four types of signals that are to be compared. Thus, when the signals that show an identical value are 2:2 in abundance ratio, it is impossible to judge which of them is the most. Accordingly, only in case where the signals that show the identical value are three in number and the difference absolute value of one signal from the other signals is equal to or larger than the threshold value, determination is so made that the judgment for normality/abnormality is possible. Thus, at step S10, judgment is carried out as to whether the difference absolute value of only one signal from the other signals is equal to or larger than the threshold value or not. When the number of signals whose difference absolute value from the other signals is only one, the operation flow goes to step S13 judging that the judgment for normality/abnormality is possible, while when the number of signals whose difference absolute value from the other signals is not only one, the operation flow goes to step S11 judging that the judgment for normality/abnormality is not possible.

Since the judgment for normality/abnormality is not possible at step S11, the steering assist control is stopped and at step S12 a lighting instruction signal is outputted from the ECU 4 thereby to put on the warming lamp.

At step S13, by the abnormality judgement circuit 17, judgment is carried out as to whether the steering torque detection signal Tt (Main) is normal or not. When the steering torque detection signal Tt (Main) is judged abnormal, the operation flow goes to step S14, while when judged normal, the operation flow goes to step S16.

At step S14, by a back-up signal selection circuit 18, either one of the steering torque detection signal Tt (Sub), the steering torque calculation signal Tts (Main) and the steering torque calculation signal Tts (Sub) is selected as a back-up signal in place of the steering torque detection signal Tt (Main) and used as a control signal.

Then, at step S15, the warning lamp is turned ON and processing of the current control period is finished.

When, at step S13, it is judged that the abnormal signal is not the steering torque detection signal Tt (Main), the operation flow goes to step S16 to still continue the steering assist control using the steering torque detection signal Tt (Main) as the control signal. However, since the abnormal signal is present except the steering torque detection signal Tt (Main), the warning lamp is turned ON at step S17.

As is described hereinabove, in the first embodiment, only when the signals whose number is equal to or greater than "N+1" show the same value, the signals are judged as normal signals and thus, even when the number of the sensor output signals that have the common factors is the largest and the sensor output signals with the common factors show abnormality because of the common factors, there is no possibility that the sensor output signals with the common factors are judged as signals showing a normal value. As a result, the accuracy of processing the abnormal signal detection can be increased.

Furthermore, when, with usage of three signals, judgment for the abnormal signal is carried out by a majority vote, there is a possibility that two abnormal signals are judged as normal ones if the two signals indicate abnormality because of the common factors. However, like in case of the first embodiment wherein the judgment for abnormal signal is carried out by using four or more signals, erroneous judgments caused by the common factors can be suppressed.

The sensor output signals that satisfy the two, that is, the first and second conditions have an enhanced reliability. Thus, when the electric motor is continuously driven and controlled by using such sensor output signals and it is found that the sensor output signals show abnormality, the steering load applied to the driver can be reduced as compared with a case where the steering assist is stopped.

Furthermore, in case where the number of signals whose difference absolute values from other signals are equal to or greater than the threshold value is not only one, the steering assist control is stopped judging that the abnormal signal can't be judged. With this, erroneous judgment is suppressed and safety of the driver is increased.

Furthermore, in case where, like in steering by wire, the steering shaft is divided into two parts and these two parts have no mechanical linking therebetween, output signals issued from sensors mounted on one part and output signals issued from the other sensors mounted on the other part have no connection based on the mechanical linking, and thus, the reliability of such signals is low as compared with that of signals issued from sensors mounted on parts that have a mechanical linking therebetween. Accordingly, by using the signals issued from sensors respectively mounted on parts that have the mechanical linking, the reliability of abnormality judgment can be increased.

Furthermore, by processing the output signals issued from the steering angle sensor and motor rotation angle sensor, the steering torque calculation signal can be derived, and by comparing the signals that are arranged as the same steering torque, abnormality of the sensor outputs can be judged.

Even when the two conditions are satisfied, the motor control may be somewhat limited as compared with the usual if an abnormality is found in the sensor output signals. With this, safety can be increased.

When the ignition switch is turned ON after the ignition switch is turned OFF, the safety of the vehicle is assured because the vehicle is at a standstill. By suppressing the steering assist under such condition, restarting of vehicle running, which may include abnormality of the vehicle, can be suppressed.

In case where an abnormality is found in the sensor output signals, an alarm light is turned ON for letting the driver know the abnormality.

By storing the abnormality information in a nonvolatile memory, identification of the abnormality at the time of vehicle inspection is facilitated.

Second Embodiment

In the above-mentioned first embodiment, abnormality of the steering torque detection signals Tt (Main) and Tt (Sub) issued from the steering torque sensors TS1 and TS2 is detected, while in the second embodiment, abnormality of the steering angle detection signals θ s (Main) and θ s (Sub) issued from the steering angle sensors AS1 and AS2 is detected.

Figure 8:
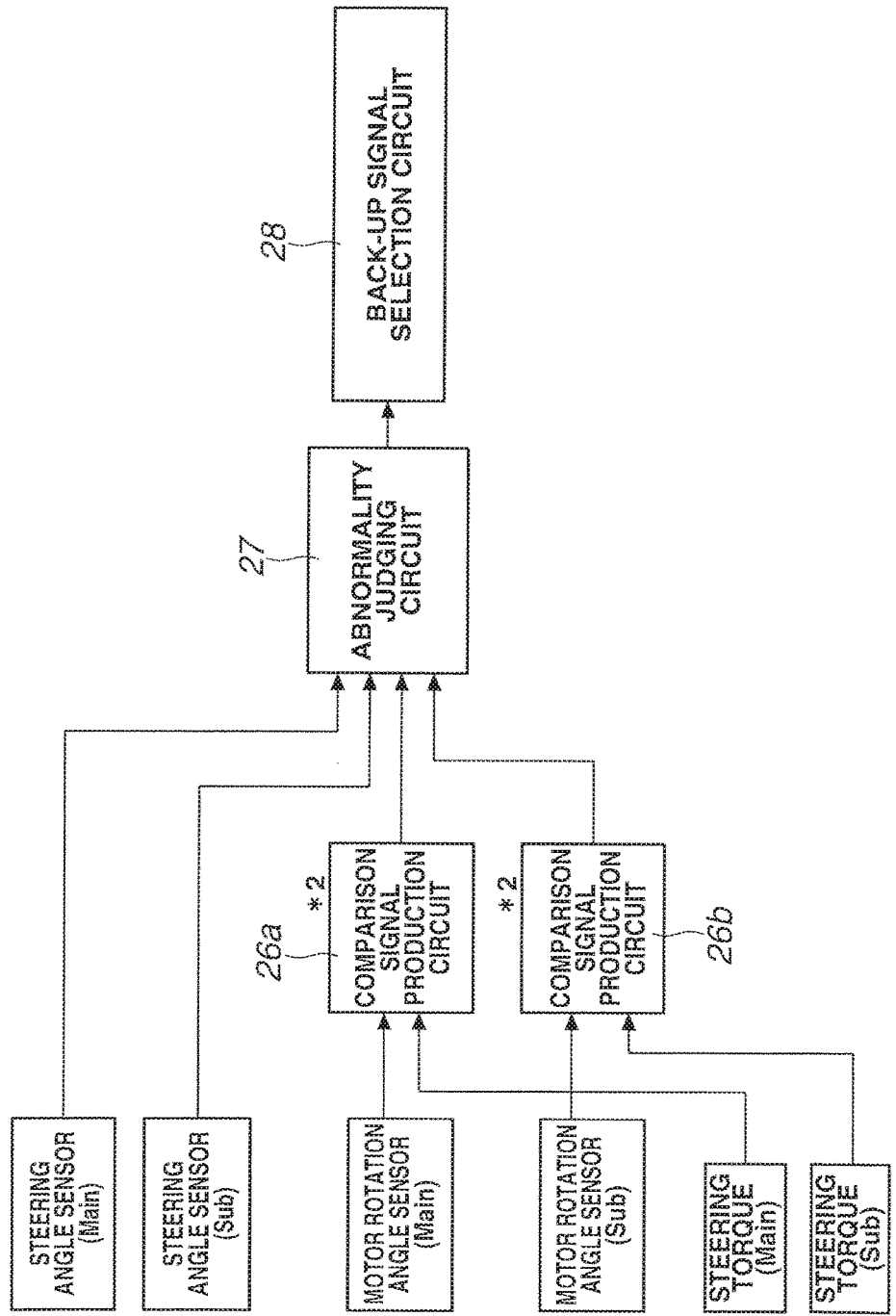
FIG. 8 is a block diagram depicting the abnormal signal detection process employed in the second embodiment.
Figure 9:
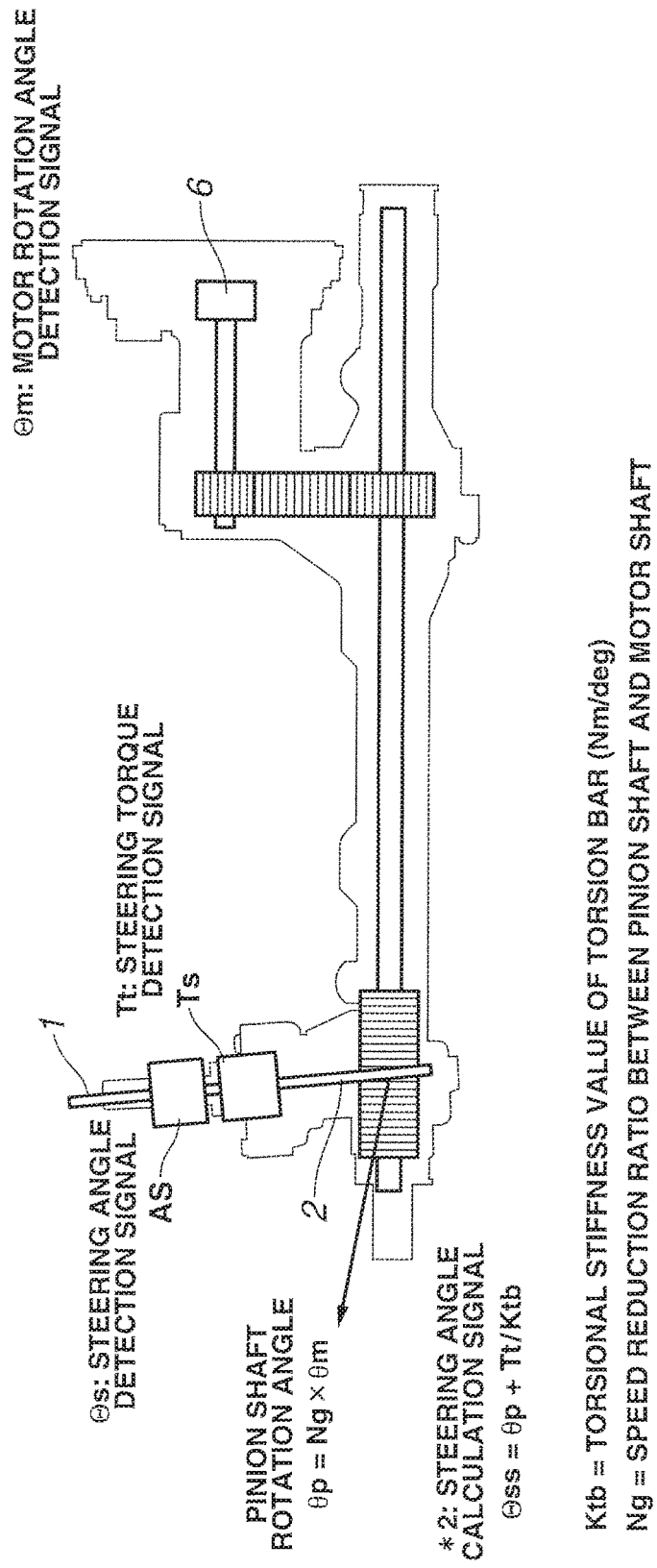
FIG. 9 is an illustration depicting a calculation method of a steering angle calculation signal.

A power steering device of the second embodiment will be described in the following with reference to a flowchart of FIG. 7, a block diagram of FIG. 8 for detecting abnormality of the steering angle detection signals and FIG. 9 that shows an example for calculating the steering angle calculation signal.

Figure 7:
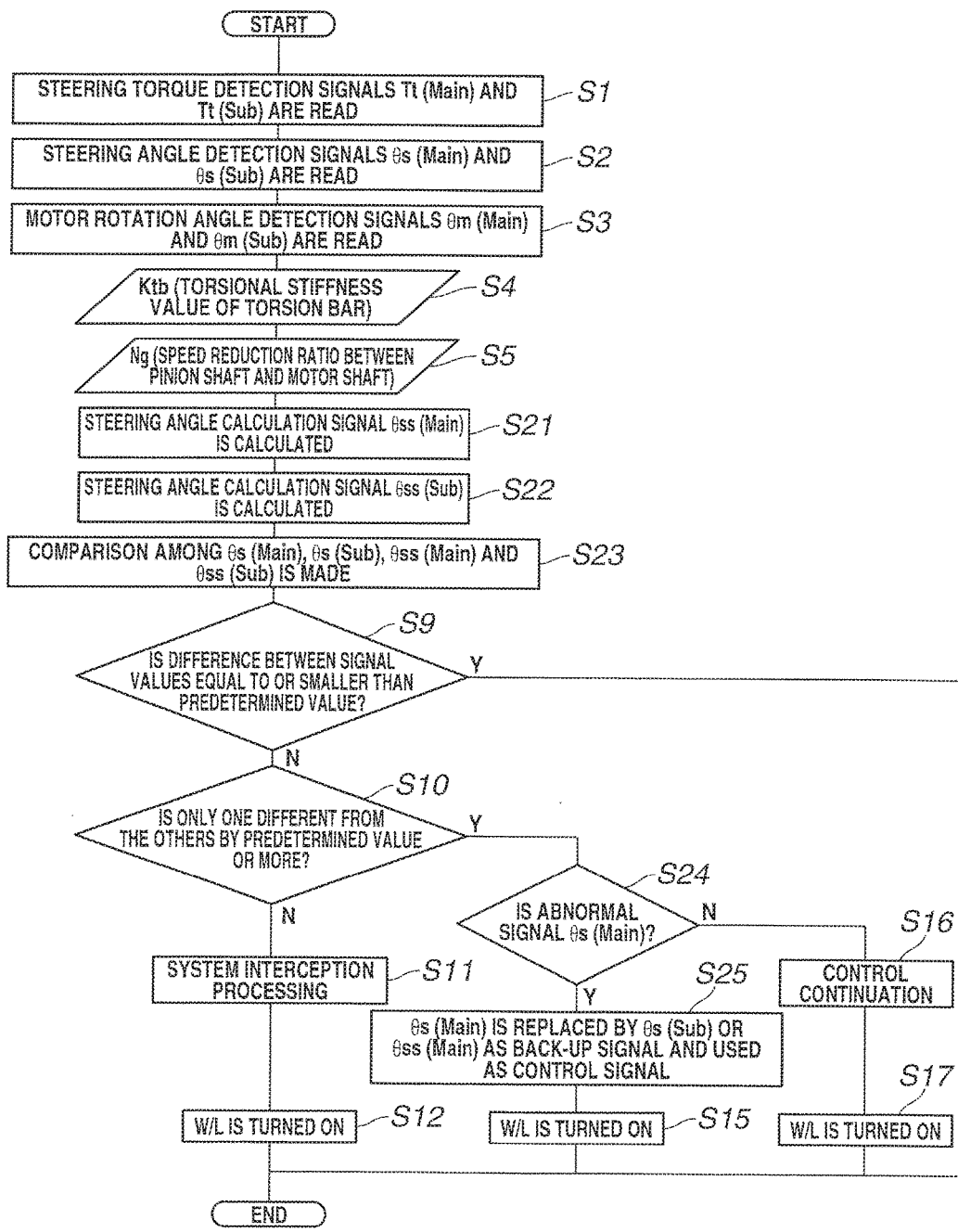
FIG. 7 is a flowchart depicting the abnormal signal detection process employed in a second embodiment.

In the second embodiment, as is seen from FIG. 7, operation steps S1 to S5, S9 to S12 and S15 to S17 are the same as those of the first embodiment. In the following explanation, operation steps that are the same as those of the first embodiment will be omitted, and only operation steps that are different from those of the first embodiment will be described.

In the second embodiment, for detecting abnormality of the steering angle detection signals θ s (Main) and θ s (Sub), steering angle calculation signals θ ss (Main) and θ ss (Sub) are calculated by first and second comparison signal production circuits 26a and 26b.

First, at step S21, by the first comparison signal production circuit 26a, the steering angle calculation signal θ ss (Main) is calculated based on the steering torque detection signal Tt (Main), the motor rotation angle detection signal θ m (Main), the torsional stiffness value Ktb of the torsion bar and the speed reduction ratio Ng between the pinion shaft 2 and the motor shaft.

Now, method for calculating the steering angle calculation signal θ ss (Main) will be explained with reference to FIG. 9. By multiplying the motor rotation angle detection signal θ m and the speed reduction ratio Ng between the pinion shaft 2 and the motor shaft, there is converted or derived a rotation angle θ p of the pinion shaft 2. By dividing the steering torque detection signal Tt by the torsional stiffness value Ktb of the torsion bar, there is derived a torsion angle T/Ktb of the torsion bar. When the torsion bar is showing a torsion, there is produced a difference in angle between the steering angle and the rotation angle θ p of the pinion shaft 2, which is caused by the torsion. Thus, by adding the rotation angle θ p of the pinion shaft 2 and the torsion angle T/Ktb of the torsion bar, there can be derived the steering angle calculation signal θ ss (Main), as will be understood from the following equation (2).

$$\theta ss = \theta p + T/Ktb \quad (2)$$

When the steering angle sensor AS is connected to a steered road wheel side relative to the torsion bar, the rotation angle θ p of the pinion shaft 2 is represented by the steering angle calculation signal θ ss, and thus, the torsion angle T/Ktb of the torsion bar becomes unnecessary.

Then, at step S22, by the second comparison signal production circuit 26b, the steering angle calculation signal θ ss (Sub) is calculated based on the steering torque detection signal Tt (Sub), the motor rotation angle detection signal θ m (Sub), the torsional stiffness value Ktb of the torsion bar and the speed reduction ratio Ng between the pinion shaft 2 and the motor shaft. The method of calculating the steering angle calculation signal θ ss (Sub) is the same as that of the steering angle calculation signal θ ss (Main).

The operation steps of S23 to S25 are the same as those of S8, S13 and S14 except that in such steps the steering torque detection signal Tt (Main) is replaced by the steering angle detection signal θ s (Main), the steering torque detection signal Tt (Sub) is replaced by the steering angle detection signal θ s (Sub), the steering torque calculation signal Tts (Main) is replaced by the steering angle calculation signal θ ss (Main) and the steering torque calculation signal Tts (Sub) is replaced by the steering angle signal θ ss (Sub).

As will be understood from the above, the second embodiment exhibits the same operation effects as the first embodiment.

Since both the steering angle detection signals θ s (Main) and θ s (Sub) are signals that represent an angle of the steering shaft, the comparison made in the first abnormality detection circuit 26 is easy and thus, judgement for the normality/abnormality is carried out with a high accuracy.

In case where the steering angle sensors AS1 and AS2 are provided at a steering wheel side relative to the torsion bar, there is produced a difference, which corresponds the torsion of the torsion bar, between the steering angle and the motor rotation angle when the torsion bar is showing its twist. Thus, by making a suitable correction to the difference, much higher accurate judgment for the normality/abnormality is carried out by the abnormality detection circuit 27.

Both the steering angle and the motor rotation angle are those that represent angular information. Thus, in case where the steering angle sensors AS1 and AS2 are provided at a steered road wheel side relative to the torsion bar, correction of a speed reduction ratio of the speed reduction device 5 or the like enables a calculation of the steering angle calculation signals θ ss (Main) and θ ss (Sub) from the motor rotation angle detection signals θ m (Main) and θ m (Sub). Since the judgment for the normality/abnormality is carried out in the abnormality detection circuit 27 based on the results of the correction, high accurate judgement is obtained.

The motor rotation angle sensors 61 and 62 detect the rotation amount after the ignition switch is turned on and are of a type that has a detecting range from 0° to 360°. Thus, by accumulating the motor rotation angle detection signals θ m (Main) and θ m (Sub) by the comparison signal production circuits 26a and 26b, an absolute angle that is a rotation angle from a neutral position of the steering wheel can be calculated. Thus, by comparing the steering angle detection signals θ s (Main) and θ s (Sub) and the motor rotation angle detection signals θ m (Main) and θ m (Sub), which are all angle representing signals, abnormality of the steering angle detection signals θ s (Main) and θ s (Sub) and the motor rotation angle detection signals θ m (Main) and θ m (Sub) can be judged.

Third Embodiment

In the third embodiment, abnormality of the motor rotation angle detection signals θ m (Main) and θ m (Sub) issued from the motor rotation angle sensors 61 and 62 is detected.

Figure 11:
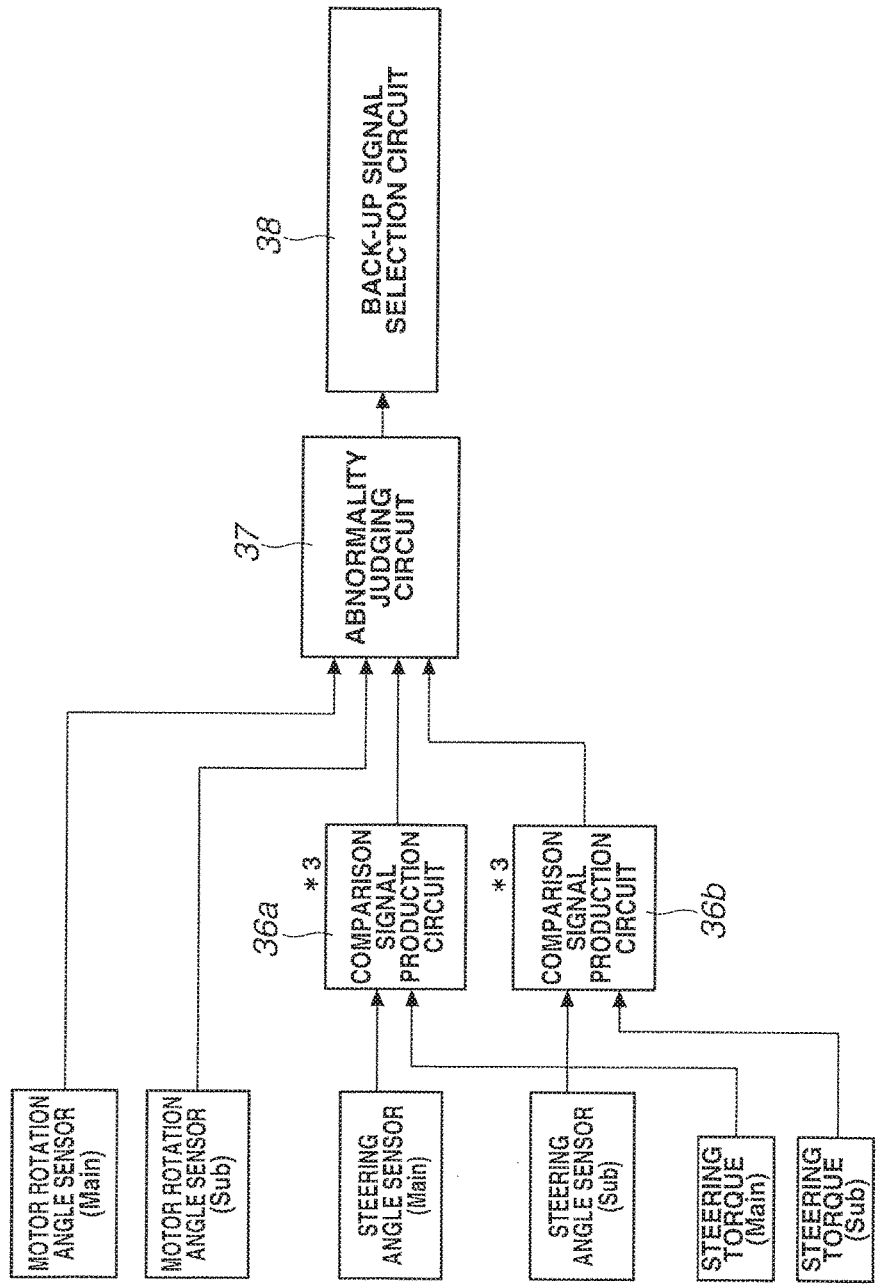
FIG. 11 is a block diagram depicting the abnormal signal detection process employed in the third embodiment.
Figure 12:
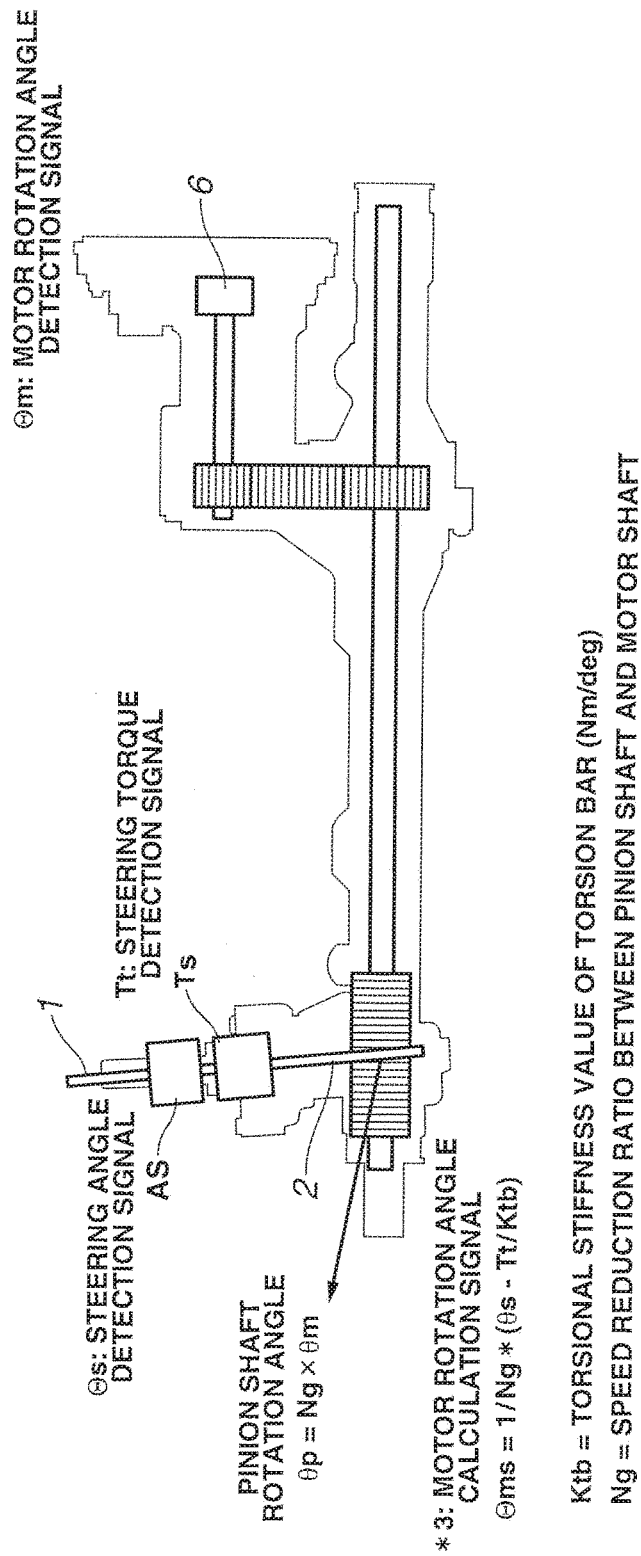
FIG. 12 is an illustration showing a method for calculating a motor rotation angle calculation signal.

A power steering device of the third embodiment will be described in the following with reference to the flowchart of FIG. 10, a block diagram of FIG. 11 that detects abnormality of the motor rotation angle detection signal and FIG. 12 that shows an example of calculating the motor rotation angle calculation signal.

Figure 10:
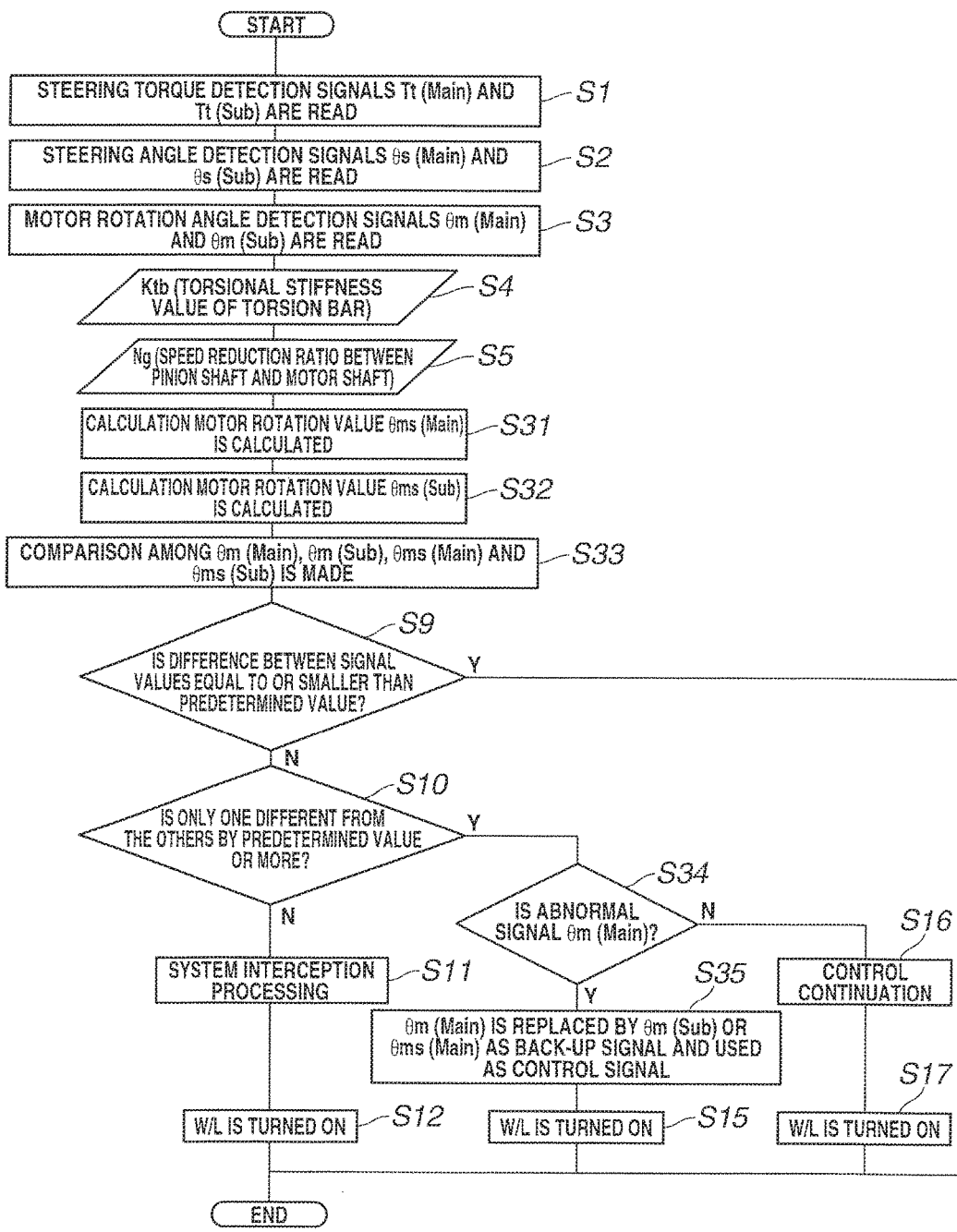
FIG. 10 is a flowchart depicting the abnormal signal detection process employed in a third embodiment.

As is seen from FIG. 10, in this third embodiment, the operation steps S1 to S5, S9 to S12 and S1 to S17 are the same as those of the first embodiment. In the following explanation, operation steps that are the same as those of the first embodiment will be omitted, and only operation steps that are different from those of the first embodiment will be described.

In the third embodiment, for detecting abnormality of the motor rotation angle sensors 61 and 62, motor rotation angle calculation signals θ ms (Main) and θ ms (Sub) are calculated in the comparison signal production circuits 36a and 36b.

At step S31, by the comparison signal production circuit 36a, the motor rotation angle calculation signal θ ms (Main) is calculated based on the steering torque detection signal Tt (Main), the steering angle detection signal θ s (Main), the torsional stiffness value Ktb of the torsion bar and the speed reduction ratio Ng between the pinion shaft 2 and the motor shaft.

Now, method for calculating the motor rotation angle calculation signal θ ms (Main) will be explained with reference to FIG. 12. By subtracting Tt/Ktb, which is calculated by dividing the steering torque detection signal Tt (Main) by the torsional stiffness value Ktb of the torsion bar, from the steering angle detection signal θ s (Main), there is derived a certain value. Then, the value is multiplied by the speed reduction ratio Ng between the pinion shaft 2 and the motor shaft to produce Ng×(θ s−Tt/Ktb). Then, 1 is divided by Ng×(θ s−Tt/Ktb) to produce the motor rotation angle calculation signal θ ms (Main). That is, the motor rotation angle calculation signal θ ms (Main) is represented by the following equation (3).

$$\theta ms = 1/Ng \times (\theta s - Tt/Ktb) \quad (3)$$

When the steering angle sensor AS is connected to a steered road wheel side relative to the torsion bar, the steering angle detection signal θ s represents the rotation angle θ p of the pinion shaft 2, and thus, Tt/Ktb becomes unnecessary.

Then, at step S32, by the second comparison signal production circuit 36b, the motor rotation angle calculation signal θ ms (Sub) is calculated based on the steering torque detection signal Tt (Sub), the steering angle detection signal θ s (Sub), the torsional stiffness value Ktb of the torsion bar and the speed reduction ratio Ng between the pinion shaft 2 and the motor shaft. The method of calculating the motor rotation angle calculation signal θ ms (Sub) is the same as that of the motor rotation angle calculation signal θ ms (Main).

The operation steps S33 to S35 are the same as those of S8, S13 and S14 except that in such steps the steering torque detection signal Tt (Main) is replaced by the motor rotation angle detection signal θ m (Main), the steering torque detection signal Tt (Sub) is replaced by the motor rotation angle detection signal θ m (Sub), the steering torque calculation signal Tts (Main) is replaced by the motor rotation angle calculation signal θ ms (Main) and the steering torque calculation signal Tts (Sub) is replaced by the motor rotation angle calculation signal θ ms (Sub).

As will be understood from the above, the third embodiment exhibits the same operation effects as the first and second embodiments.

Fourth Embodiment

In the fourth embodiment, abnormality of a current detection signal used for controlling the power steering device by an inverter circuit 12 and abnormality of a current detection signal used for detecting overcurrent are detected.

A control device for a vehicle-mounted instrument of the fourth embodiment will be described with reference to the flowchart of FIG. 13 and a block diagram of FIG. 14 that detects abnormality of a current detection signal.

Figure 13:
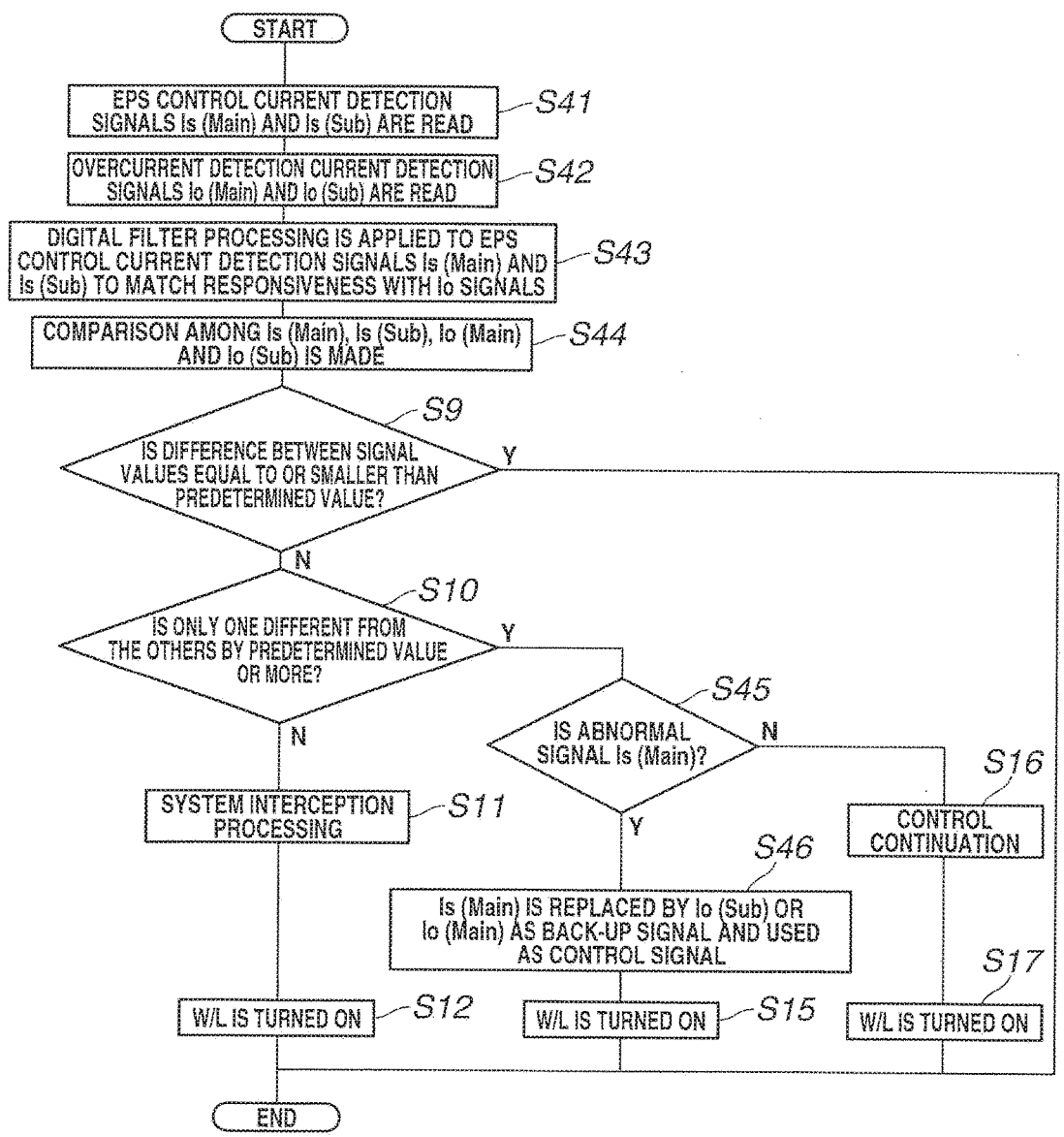
FIG. 13 is a flowchart depicting the abnormal signal detection process employed in a fourth embodiment.

As is seen from FIG. 13, in the fourth embodiment, the operation steps S9 to S12 and S15 to S17 are the same as those of the first embodiment. In the following, the operation steps that are the same as those of the first embodiment will be omitted, and only operation steps that are different from those of the first embodiment will be described.

At step S41, current detection signals Is (Main) and Is (Sub) that are output currents of the inverter circuit 12 and used for controlling EPS are read, and at step S42, current detection signals Io (Main) and Io (Sub) that are used for detecting overcurrent are read.

Figure 14:
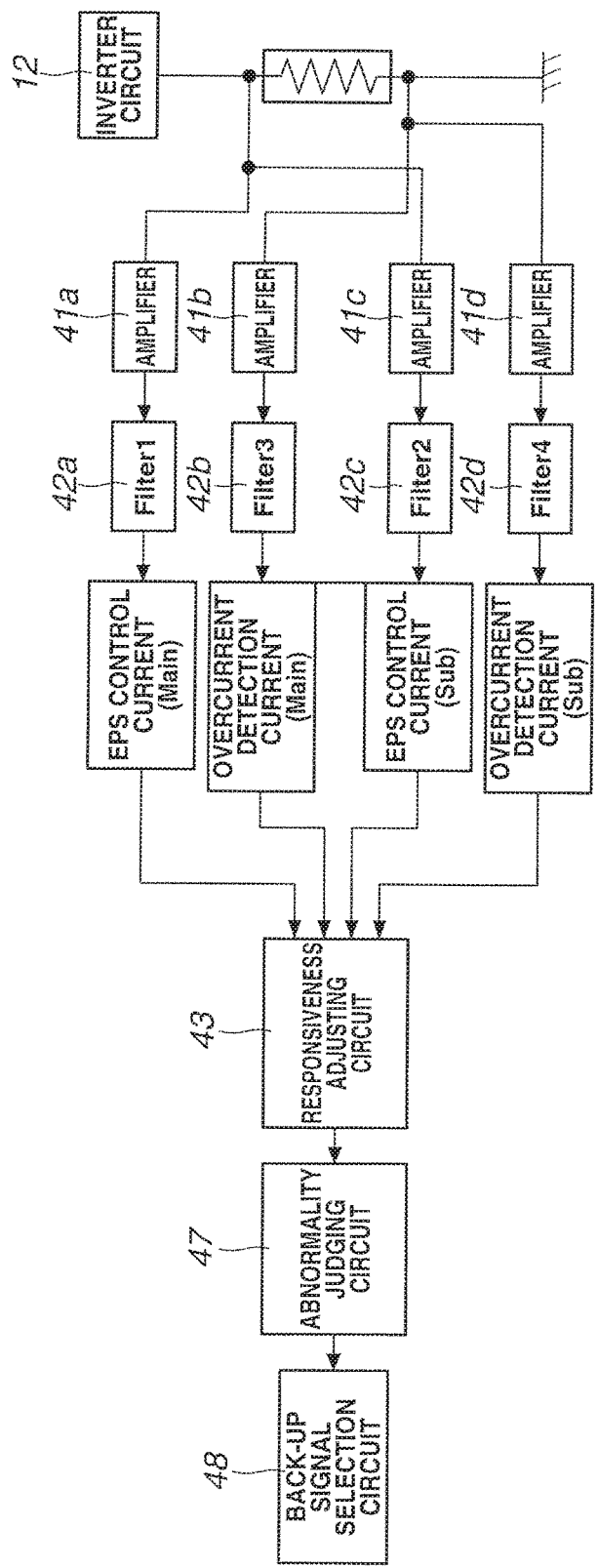
FIG. 14 is a block diagram depicting the abnormal signal detection process employed in the fourth embodiment.

As will be understood from FIG. 14, the current detection signals Is (Main) and Is (Sub) for controlling the EPS are those that have been detected by a current sensor 11a and treated by amplifiers 41a and 41c and first and second filter circuits 42a and 42c. The first and second filter circuits 42a and 42c have substantially the same responsiveness and output signals to the ECU 4 after making a band limitation or removing specified frequency component.

As will be understood from FIG. 14, the current detection signals Io (Main) and Io (Sub) for detecting the overcurrent are those that have been detected by the current sensor 11a and treated by amplifiers 41b and 41d and third and fourth filter circuits 42b and 42d. The third and fourth filter circuits 42b and 42d have a responsiveness different from that of the first and second filter circuits 42a and 42c and output signals to the ECU 4 after making a band limitation or removing specified frequency component.

Then, at step S43, by a responsiveness adjusting circuit 43, for detecting abnormality of the current detection signals Is (Main) and Is (Sub) that control the EPS and abnormality of the current detection signals Io (Main) and Io (Sub) that detect the overcurrent, responsiveness is adjusted so that all signals have an even responsiveness. Usually, the first and second filter circuits 42a and 42c used for filtering the current detection signals Is (Main) and Is (Sub) that control the EPS have a higher responsiveness and a higher cut-off frequency, and thus by further filtering the current detection signals Is (Main) and Is (Sub) that control the EPS, the responsiveness of the signals can be made even with ease.

If desired, evenness of the responsiveness may be made by adjusting both the responsiveness of the current detection signals Is (Main) and Is (Sub) that control the EPS and the responsiveness of the current detection signals Io (Main) and To (Sub) that detect the overcurrent. When the responsiveness of both the current detection signals is adjusted, adjusting range of each signal can be reduced.

Operation steps S44 to S46 are the same as those of steps S8, S13 and S14 except that in the operation steps the steering torque detection signal T (Main) is replaced by the current detection signal Is (Main) that controls the EPS, the steering torque detection signal Tt (Sub) is replaced by the current detection signal Is (Sub) that controls the EPS, the steering torque calculation signal Tts (Main) is replaced by the current detection signal Io (Main) that detects the overcurrent and the steering torque calculation signal Tts (Sub) is replaced by the current detection signal Io (Sub) that detects the overcurrent.

As will be understood from the above, the fourth embodiment exhibits the same operation effects as the first embodiment.

In addition to the above, judgement for normality/abnormality of the current sensor 11a and the filter circuits 42a to 42d that filter the detection signals from the current sensor 11a can be carried out with a high accuracy.

Fifth Embodiment

Figure 15:
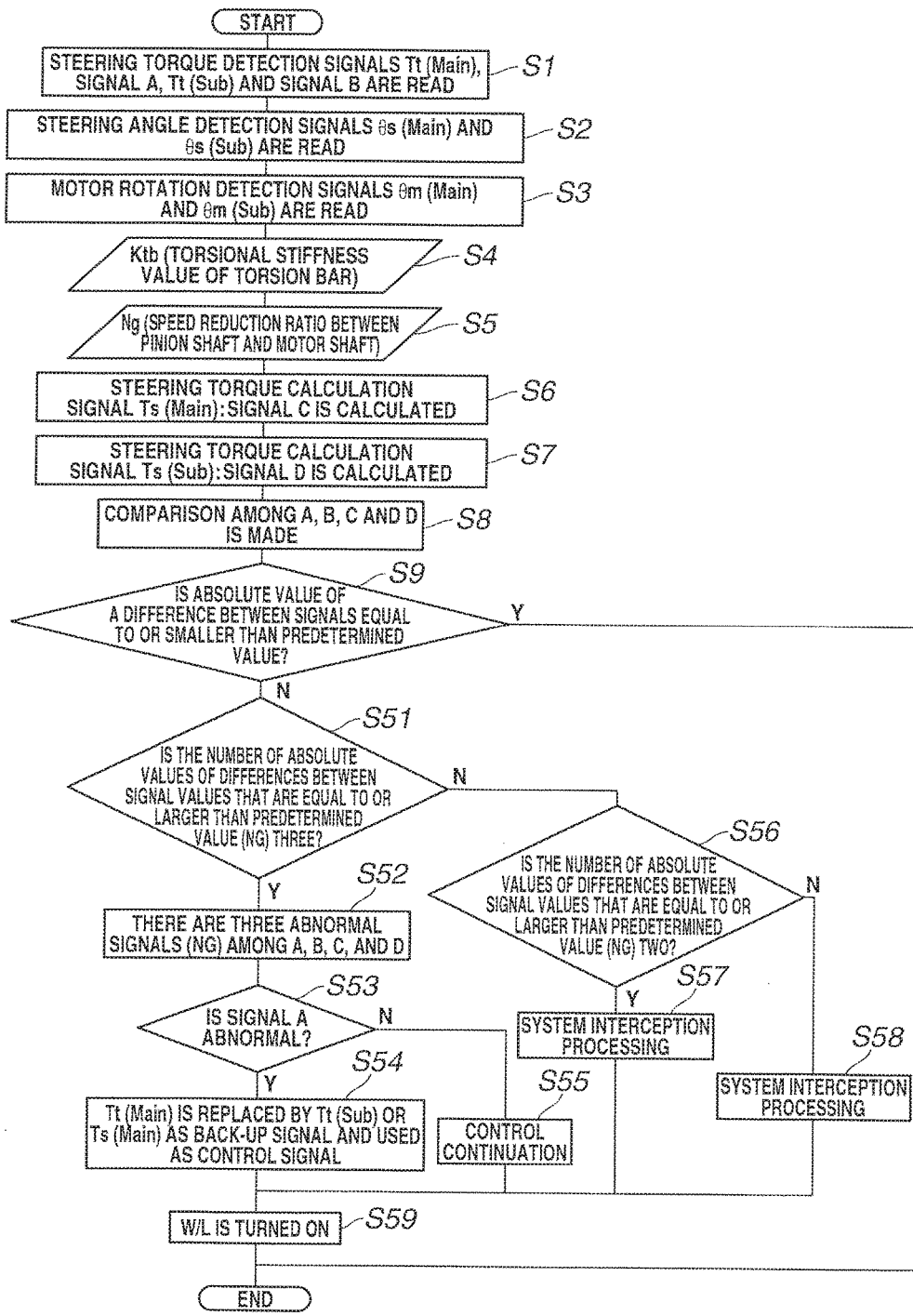
FIG. 15 is a flowchart depicting the abnormal signal detection process employed in a fifth embodiment.

A power steering device of the fifth embodiment will be described in the following with reference to FIG. 15 that shows a flowchart and FIG. 16 that shows difference absolute values of case 1 and case 2.

As is seen from FIG. 15, in the fifth embodiment, operation steps S1 to S9 are the same as those of the first embodiment and thus explanation of such steps will be omitted, and operation steps S51 to S59 that are different from those of the first embodiment will be described in the following. Now, the steering torque detection signal Tt (Main) will be represented by A, the steering torque detection signal Tt (Sub) will be by B, the steering torque calculation signal Tts (Main) will be by C and the steering torque calculation signal Tts (Sub) will be by D.

At step S9, by the abnormality judging circuit 17, judgment is carried out as to whether the difference absolute value between the signals is equal to or smaller than a threshold value or not. In the fifth embodiment, as is seen from FIG. 16, the threshold value is set to 0.8. When all the difference absolute values between the signals are smaller than the threshold value, the processing in the current control period is finished judging that there is no abnormality, and when some of the difference absolute values between the signals are larger than the threshold value, the operation flow goes to step S51.

At steps S51 to S53, by the abnormality judging circuit 17, judgment is carried out as to which signal is normal or abnormal among the signals A, B, C and D.

By the abnormality judging circuit 17, judgement is so made that when a signal fulfils the following first and second conditions, the signal is judged normal, and the other signals are judged abnormal.

First condition: The number of signals that indicate the identical values is largest.

Second condition: The number of signals that indicate the identical values is equal to or larger than n+1 (since in the fifth embodiment, n=1 is given, n+1 shows 2).

Figure 16:
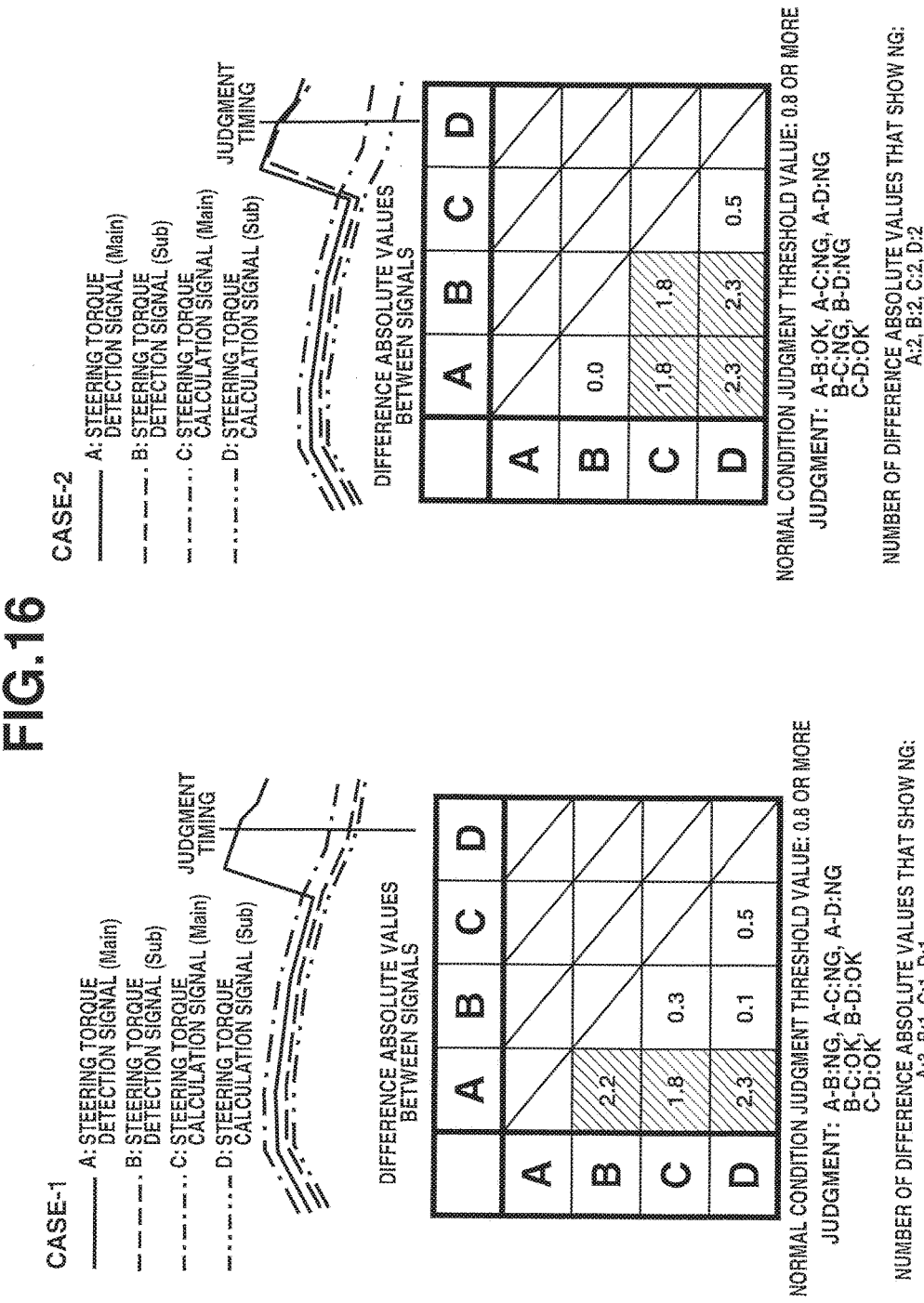
FIG. 16 shows illustrations that show difference absolute values in cases 1 and 2 in the fifth embodiment.

In the case 1 shown by FIG. 16, the total number of the signals is 4, and thus, when the number of the signals that show the identical value is equal to or greater than 3, the signals are judged as the largest in number, and when the number of the signals that show the identical value is 2, the signals are not judged as the largest in number.

First, at step S51, judgment is carried out as to whether or not the number of signals whose difference absolute values from other signals are equal to greater than a threshold value (NG) is equal to or greater than 3.

In the case 1 of FIG. 16, A–B=NG, A–C=NG, A–D=NG, B–C=OK, B–D=OK and C–D=OK are established. That is, the signals having A are three in number, the signals having B are one in number, the signals having C are one in number and the signals having D are one in number. Since there are three or more signals A whose difference absolute values are equal to or greater than the threshold value, the operation flow goes to step S52.

Then, at step S52, judgement is carried out as to which one is abnormal among the signals A, B, C and D. In the case 1 of FIG. 16, the number of signals B, C and D that indicate the identical value is three in number, and thus, both the first and second conditions are fulfilled, and thus, the signals B, C and D are judged normal, and the signal A is judged abnormal. At step S53, judgment is carried out as to whether or not the abnormal signal is the signal A (viz., the steering torque detection signal Tt (Main)) that is used for the steering assist control. If the abnormal signal is the steering torque detection signal Tt (Main), the operation flow goes to step S54, and if not, the operation flow goes to step S55. In case 1 of FIG. 16, since the abnormal signal is the steering torque detection signal Tt (Main), the operation flow goes to step S54.

At step S54, by the back-up signal selection circuit 18, the steering torque detection signal Tt (Sub), the steering torque calculation signal Tts (Main) and the steering torque calculation signal Tts (Sub) are used as back-up signals in place of the steering torque detection signal Tt (Main).

Thereafter, at step S59, the warning lamp is turned ON and the processing in the current control period is finished.

If at step S53 it is judged that the abnormal signal is not the signal A (viz., steering torque detection signal Tt (Main)), the operation flow goes to step S55, and the steering assist control is still continued using the steering torque detection signal Tt (Main) as the control signal. However, since there are abnormal signals besides the steering torque detection signal Tt (Main), the warning lamp is tuned ON at step S59.

In the following, description will be directed to case 2 of FIG. 16 where the number of the signals whose difference absolute values from other signals are equal to or greater than the threshold value is equal to or smaller than 3.

In case 2 of FIG. 16, the signals A and B are abnormal. In the case, A–B=OK, A–C=NG, A–D=NG, B–C=NG, B–D=NG and C–D=OK are established. That is, the number of the signals A with NG is 2, the number of the signals B with NG is 2, the number of the signals C with NG is 2 and the number of the signals D with NG is 2. When like this the number of the signals whose difference absolute values from the other signals are equal to or greater than the threshold value is smaller than 3, the operation flow goes to step S56 judging that the abnormal signal can't be identified.

At step S56, judgment is carried out as to whether or the number of the signals whose difference absolute values are equal to or greater than the threshold value is 2. If Yes, the operation flow goes to step S57, and if No, the operation flow goes to step S58.

In steps S57 and S58, since the abnormal signals can't be identified, the steering assist control is stopped and the warning lamp is turned ON at step S59.

The fifth embodiment exhibits the same operation effects as the first embodiment.

Sixth Embodiment

A control device for a vehicle-mounted equipment of the sixth embodiment will be described in the following with reference to a flowchart of FIG. 17, a block diagram of FIG. 18, and abnormal pattern examples of FIGS. 19 and 20.

Figure 18:
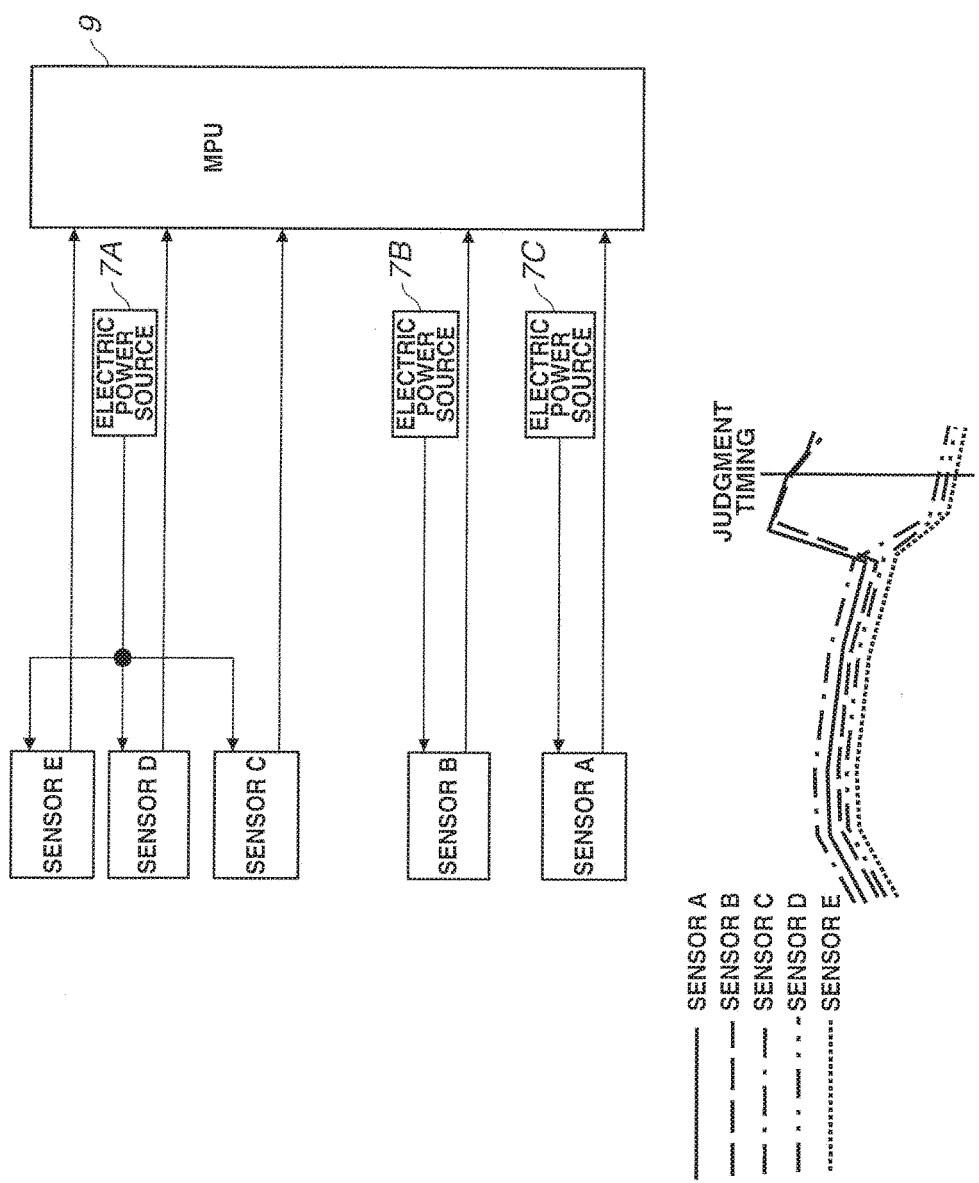
FIG. 18 is a block diagram showing common factors employed in the sixth embodiment.

In the sixth embodiment, as is seen from FIG. 18, sensors C, D and E are supplied with electric power from the same power source 7A, and sensors A and B are supplied with electric power from respective power sources 7C and 7B. In the sixth embodiment, the vehicle-mounted instrument is controlled based on output signals from the sensor A.

Figure 17:
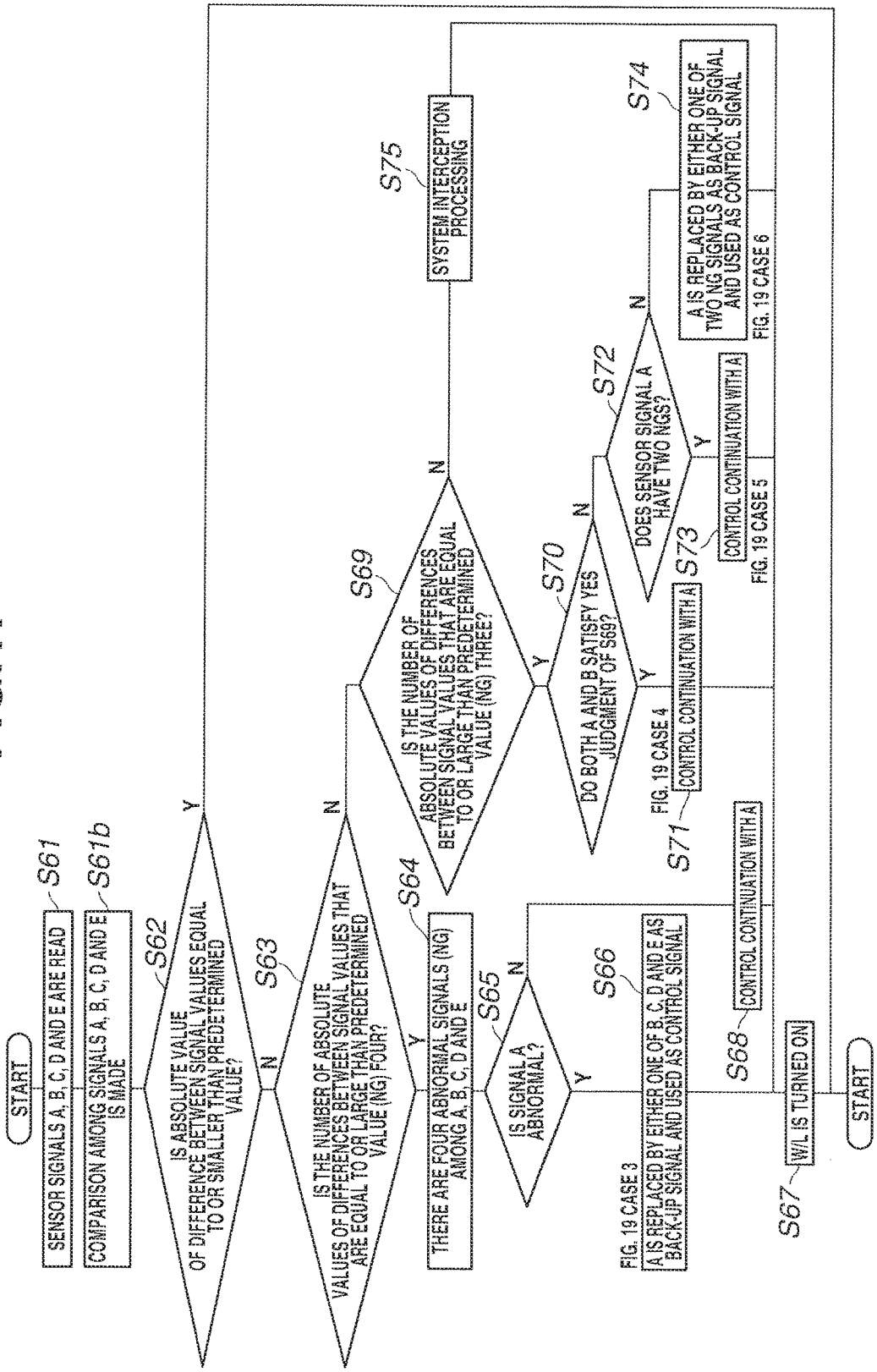
FIG. 17 is a flowchart depicting the abnormal signal detection process employed in a sixth embodiment.

As is seen from FIG. 17, output signals from the sensors A, B, C and D are read at step S61a.

Then, at step S61b, the signals are compared with each other and respective difference absolute values are calculated, and at step S62, judgment is carried out as to whether or not the difference absolute values are equal to or greater than the threshold value. In case where all the difference absolute values between the signals are smaller than the threshold value, the processing of the current control period is finished judging that there is no abnormality. While in case where some of the difference absolute values between the signals are larger than the threshold value, the operation flow goes to step S63.

In steps S63 to S65, by the abnormality judging circuit 17, judgment is carried out as to which one is normal or abnormal among the output signals from the sensors A, B, C, D and E.

In the abnormality judging circuit 17, judgment is so made that if a signal fulfills the following first and second conditions, the signal is judged normal and if not, the signal is judge abnormal.

First condition: the number of signals that indicate the same value is the largest.

Second condition: the number of signals that indicate the same value (in the sixth embodiment, n is 3, and thus, n+1=4 is established) is equal to or greater than n+1.

Figure 19:
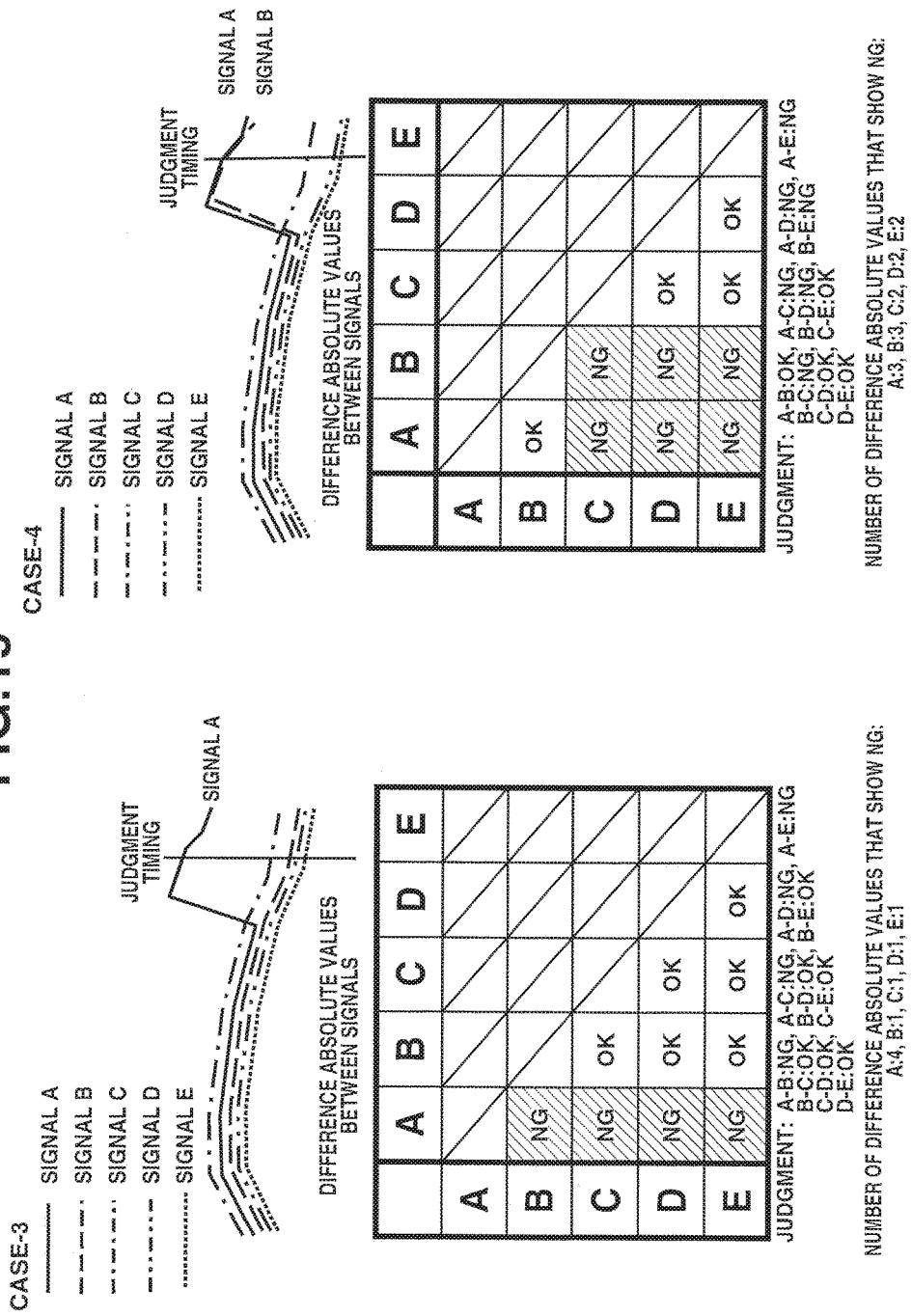
FIG. 19 shows illustrations that show difference absolute values in cases 3 and 4 in the sixth embodiment.

In case 3 of FIG. 19, the total of the signals is five in number, and thus, when the number of signals that indicate the same value is three or more, it is determined that the signals are the largest in number.

First, at step S63, by the abnormality judging circuit 17, judgment is carried out as to whether or not the number of the signals whose difference absolute values from the other signals are equal to or larger than the threshold value is four or more.

In case 3 of FIG. 19, the signal A is abnormal. In the case, A–B=NG, A–C=NG, A–D=NG, A–E=NG, B–C=OK, B–D=OK, B–E=OK, C–D=OK, C–E=OK and D–E=OK are established. That is, the number of the signals A with NG is 4, the number of the signals B with NG is 1, the number of the signals C with NG is 1, the number of the signals D with NG is 1 and the number of the signals E with NG is 1. When, like in case of the output signals of the sensor A, the number of the signals whose difference absolute values from other signals is four, the operation flow goes to step S64.

At step S64, by the abnormality judging circuit 17, judgment is carried out as to which one is abnormal or abnormal among the output signals from the sensors A, B, C, D and E, and at step S65, judgment is carried out as to whether the abnormal signal is the output signal from the sensor A or not. If the abnormal signal is the output signal from the sensor A, the operation flow goes to step S66, and if not, the operation flow goes to step S68. In case 3 of FIG. 19, since the output signal from the sensor A is abnormal, the operation flow goes to step S66.

At step S66, by a back-up signal selection circuit 18, either one of the output signals from the sensors B to E is employed as a control signal in place of the output signal from the sensor A.

Then, at step S67, the warning lamp is turned ON and the processing for the current control period is finished.

When, at step S65, it is judged that the abnormal signal is not the output signal from the sensor A, the operation flow goes to step S68, and thus the control based on the output signal from the sensor A is further continued. However, since abnormal signals are present besides the normal output signal from the sensor A, the warming lamp is turned ON at step S67.

In case 4 of FIG. 19, A–B=OK, A–C=NG, A–D=NG, A–E=NG, B–C=NG, B–D=NG, B–E=NG, C–D=OK, C–E=OK and D–E=OK are established. That is, the number of the signals A with NG is 3, the number of the signals B with NG is 3, the number of the signals C with NG is 2, the number of the signals D with NG is 2 and the number of the signals E with NG is 2.

When, like in this case, the number of the signals whose difference absolute values from other signals are equal to or larger than the threshold value is not equal to or larger than 4, the operation flow goes from step S63 to S69.

At step S69, judgment is carried out as to whether the number of the signals whose difference absolute values are equal to or larger than the threshold value (that is, the signals are NG) is three or not. In case 4 of FIG. 19, the number of NG output signals from the sensors A and B is three and thus, the operation flow goes to step S70.

At step S70, judgment is carried out as to whether or not the output signals that are respectively issued from the sensors A and B and have not common factors include three NG signals respectively.

In case 4 of FIG. 19, when judging the abnormal signals by simple majority rule, the number of the signals A with NG is 3, the number of the signals B with NG is 3, the number of the signals C with NG is 2, the number of the signals D with NG is 2 and the number of the signals E with NG is 2. Thus, it is judged that the output signals from the sensors A and B are judged abnormal. However, since the sensors C, D and E have the power source 7A as a common factor, all of the output signals from the sensors C, D and E are enforced to show abnormality when an abnormality happens in the power source 7A. Furthermore, only when the sensors A and B and the power sources 7B and 7C become abnormal in operation at the same time, the output signals from the sensors A and B become abnormal at the same time. Accordingly, the possibility wherein the output signals from the sensors A and B become abnormal at the same time is low. Thus, at step S70, judgment is so made that when the output signals with no common factor from the sensors A and B contain NG signals whose number "n" is the same as the largest number of the signals with the common factor, the output signals with the common factor from the sensors C, D and E are judged abnormal.

When at step S70 the output signals from the sensors C, D and E are judged as abnormal, the operation flow goes to step S71 where the control based on the output signal from the sensor A is still continued. However, since the output signals from the sensors C, D and E are abnormal, the warning lamp is turned ON at step S67.

In case 5 depicted by FIG. 20, A–B=NG, A–C=OK, A–D=OK, A–E=NG, B–C=NG, B–D=NG, B–E=OK, C–D=OK, C–E=NG and D–E=NG are established. That is, the number of the signals A with NG is 2, the number of the signals B with NG is 3, the number of the signals C with NG is 2, the number of the signals D with NG is 2 and the number of the signals E with NG is 3.

In this case, at step S70, judgment is carried out as to whether the output signals that have no common factor and are respectively issued from the sensors A and B contain three NG signals or not. Since the result is NO, the operation flow goes to step S72.

At step S72, judgment is carried out as to whether the output signals from the sensor A have two NG signals or not. In case 5 depicted by FIG. 20, the output signals from the second A have two NG signals. Since the output signals from the sensor A have no common factor and have the largest number of the signals that show the same value, the output signals are judged normal. Furthermore, the output signals that are issued from the sensors C and D and whose difference absolute values from the output signals of the sensor A are smaller than the threshold value are judged normal. If YES at step S72, the operation flow goes to step S73.

At step S73, since the output signals issued from the sensor A and used for the control are normal, the control based on the output signals from the sensor A is still continued. However, since other signals contain abnormal ones, the warning lamp is turned ON at step S67.

In case 6 depicted by FIG. 20, A-B=NG, A-C=OK, A-D=NG, A-E=NG, B-C=NG, B-D=OK, B-E=OK, C-D=NG, C-E=NG and D-E=OK are established. That is, the number of the signals A with NG is 3, the number of the signals B with NG is 2, the number of the signals C with NG is 3, the number of the signals D with NG is 2 and the number of the signals E with NG is 2.

When in such case judgment is carried out at step S72, the output signals from the sensor A are judged abnormal since the output signals from the sensor A contain three NG signals. While, since the output signals from the sensor B have no common factor and have the largest number of signals that show the same value, the output signals are judged as normal signals. Furthermore, the output signals that are issued from the sensors D and E and whose difference absolute values from the output signals from the sensor B are equal to or smaller than the threshold value are judged as normal signals. If NO is issued at step S72, the operation flow goes to step S74.

Since at step S74 the output signals issued from the sensor A are abnormal, the output signals issued from the sensors B, D and E and judged as normal are used for the control in place of the output signals from the sensor A, and the control is continued. Since the output signals from the sensors A and C are abnormal, the warning lamp is turned ON at step S67.

When at step S69 it is judged that the number of the signals whose difference absolute values are equal to or larger than the threshold value is not three, judgment for normality/abnormality can't be carried out, and thus, the steering assist control is stopped.

As will be understood from the above, the sixth embodiment exhibits the same operation effects as the first embodiment.

Furthermore, in case where, like in case 4 of FIG. 19, the output signals of the sensors A and B that don't belong to the group that has the largest number of signals have n NG signals of the group that has the largest number of signals, the output signals of the sensors A and B are judged normal and the output signals of the sensors C, D and E that have the common factor are judged abnormal. With such judgment, misjudgment that would be induced when the signals become abnormal due to abnormality of the common factor can be suppressed.

Furthermore, in case where, like in cases 5 and 6 of FIG. 20, the output signals don't belong to the group that has the largest number of signals and have a less number of NG signals (that is, the signals that show the same value and are largest in number), the signals are judged normal. With such judgment, accuracy of the judgment for normality/abnormality of the signals can be increased, and at the same time, the control can be continued thereby to relieve burden of the driver.

In case where abnormalities occur in the electric power source circuit 7 and the supply voltage, the sensors and the circuits that are supplied with the electric power from the electric power source circuit 7 are affected by the abnormalities, and thus, corresponding abnormal output signals tend to be outputted from the sensors and the circuits. Thus, by setting the electric power supply circuit as a common factor, misjudgment that would be caused by the common factor can be suppressed.

In case where the output signals from sensors have a harness as a common factor and abnormality of the harness, such as snapping of the harness or the like, occurs, the sensors and circuits that are connected to the harness are affected by the abnormality, and thus, it tends to occur that the sensors output abnormal signals. Thus, by setting the harness as a common factor, misjudgment caused by the common factor can be suppressed.

In the above, concrete examples of the invention are described in detail. However, to those skilled in the art, various deformations and amendments to the examples within the technical concept of the invention are possible, and thus, it is natural that such deformations and amendments belong to the scope of patent claiming.

For example, the plurality of sensor output signals may be signals that are outputted from different detection elements or may be detection signals that are outputted from different electronic circuits after being detected by the common detection elements.

Now, examples that are other than the claimed ones defined in the scope of Claims, have a technical concept possessed by the above-mentioned embodiments will be described in the following together with their effects.

(a) A power steering device is a device as defined in Claim 4, in which a comparison signal production circuit is provided for calculating a rotation amount corresponding value of the steering shaft by accumulating the first and second motor rotation angle detection signals, and in which by comparing the first second steering angle detection signals and the rotation amount corresponding value, abnormality of the first and second steering angle detection signals and abnormality of the first and second motor rotation angle detection signals are judged.

According to the technical concept explained in (a), by making a comparison between the first and second steering angle detection signals and the first and second motor rotation angle detection signals, which are all of a type that indicates an angle, abnormality of the first and second steering angle detection signals and abnormality of the first and second motor rotation angle detection signals can be judged.

(b) A power steering device is a device as defined by (a), in which a comparison signal production circuit is provided for correcting the first and second steering angle detection signals or the first and second motor rotation angle detection signals based on the torsion amount of the torsion bar, and in which the abnormality judging circuit judges abnormality of the first and second steering angle detection signals and the first and second motor rotation angle detection signals by making a comparison between the first and second steering angle detection signals that have been corrected and between the first and second motor rotation angle detection signals that have been corrected.

According to the technical concept explained in (b), between the first and second steering angle detection signals and the first and second motor rotation angle detection signals, there is a gap that corresponds to the torsion amount of the torsion bar. Thus, by correcting the gap, much accurate comparison is carried out.

(c) A power steering device is a device as defined by Claim 7, in which when the plurality of the sensor output signals contain the abnormal values and some of the sensor output signals satisfy the first and second conditions, the value of the motor command signal is reduced as compared with a case where the plurality of second output signals don't contain the abnormal values, and in which based on the reduction of the value of the motor command signal and the sensor output signals that have been judged normal, the electric motor is continuously driven and controlled.

According to the technical concept explained in (c), in case where, even when the two conditions are satisfied, the sensor output signals contain abnormal values, safety can be increased by controlling the motor with a limitation larger than the usual.

(d) A power steering device is a device as defined by Claim 7, in which in case where the plurality of sensor output signals contain abnormal values and some of the sensor output signals satisfy the first and second conditions, the motor control circuit is suppressed from making the drive control to the electric motor if the ignition switch of the vehicle is turned ON after OFF turning of the switch.

According to the technical concept explained in (d), when the ignition switch is turned ON after OFF turning of the switch, the safety of the vehicle is assured since the vehicle is at a standstill. By stopping the steering assist under such condition, starting of the vehicle movement with a fear of abnormality can be suppressed.

(e) A power steering device is a device as defined by Claim 7, in which when the plurality of sensor output signals contain the abnormal values, the ECU outputs a lamp ON signal to turn ON the warning lamp of the vehicle.

According to the technical concept explained in (e), in case where the sensor output signals contain abnormal values, the warning lamp is turned ON. With such lamp-on warning, the driver can realize the abnormality.

(f) A power steering device is a device as defined by Claim 7, in which the ECU further comprises a non-volatile memory, and in which when the plurality of sensor output signals contain the abnormal values, the ECU stores information on the abnormality in the non-volatile memory.

According to the technical concept explained in (f), due to memorization of the abnormality by the non-volatile memory, finding abnormality at the time of vehicle inspection becomes easy.

(g) A power steering device is a device as defined by Claim 8, in which the common factor is the power source circuit which feeds both the detection element and the electronic circuit with electric power.

According to the technical concept explained in (g), when abnormality occurs in the electric power source circuit and the supply voltage, the sensors and/or circuits that are fed with the electric power form the electric power source circuit are affected by the abnormality, and thus, there is such a possibility that the sensors or circuits output abnormal signals. Thus, by setting the electric power source circuit as a common factor, misjudgment that would be caused by the factor can be suppressed.

(h) A control device for a vehicle-mounted instrument is a device as defined by Claim 8, in which the common factor is a harness connected to the detection element or the electronic circuit.

According to the technical concept explained in (h), when abnormality, such as disconnection or the like, occurs in the harness used as the common factor, the sensors or the circuits that are connected to the harness are affected by the abnormality, and thus there is such a possibility that the sensors or the circuits output abnormal signals. Thus, by setting the harness as a common factor, misjudgment that would be caused by the common factor can be suppressed.

(i) A control device for a vehicle-mounted instrument is a device as defined by Claim 8, in which the plurality of sensors are arranged in a zone where some of the members that constitute the vehicle-mounted equipment have a mechanically transmitting system through which movements of some of the members are mechanically transmitted to other members.

According to the technical concept explained in (i), since sensor output signals issued from members that haven't a mechanical connection therebetween haven't correspondence relation based on the mechanical connection, reliability of the sensor output signals is low as compared with the output signals issued from sensors that are provided on the members that have a mechanical connection therebetween. Thus, by using the output signals issued from the members that have the mechanical connection therebetween, reliability of the abnormality judgment can be increased.

(j) A control device for a vehicle-mounted equipment is a device as defined by Claim 8, in which the vehicle-mounted instrument is continuously controlled based on the sensor output signals which have been judged normal due to satisfaction of the first and second conditions by the abnormality judging circuit.

According to the technical concept explained in (j), the sensor output signals that satisfy the two conditions have a high reliability. Thus, by continuously controlling the vehicle-mounted equipment by using such reliable output signals, the driver's convenience can be improved as compared with a case where the control for the vehicle-mounted equipment is stopped due to appearance of abnormal values of the plurality of sensor output signals.

The invention claimed is:

1. A power steering device comprising:
   a steering mechanism that steers steered road wheels in response to a steering operation of a steering wheel;
   an electric motor that supplies the steering mechanism with a steering force;
   an ECU that drives and controls the electric motor;
   a motor control circuit that is installed in the ECU and outputs a motor command signal for driving and controlling the electric motor in accordance with an operation condition of a vehicle;
   a plurality of sensors that detect a steering condition of the steering mechanism or a driving condition of the electric motor;
   a detection signal receiving section that is installed in the ECU and receives a plurality of sensor output signals, the sensor output signals being mutually different detection signals issued from the plurality of sensors and four and more in number; and
   an abnormality judging circuit that is installed in the ECU and judges abnormality of the sensor output signals by comparing the plurality of sensor output signals,
   in which:
      the plurality of sensor output signals are detection signals that are issued from mutually different detection elements or detection signals that are detected by a common detection element and then treated by mutually different electronic circuits;
      when, among groups of the sensor output signals that share a common factor, which is a factor by which the sensor output signals are subjected to change due to a common cause, the number of the signals of the groups to which a maximum number of signals belongs is n, and
      the abnormality judging circuit judges that the sensor output signals are normal when these sensor output signals satisfy first and second conditions and the other sensor output signals are abnormal, the first condition being a condition in which the number of the sensor output signals showing an identical value is the largest, the second condition being a condition in which the number of the sensor output signals is equal to or larger than n+1.

2. A power steering device as claimed in claim 1, in which a speed reduction device is provided between the steering mechanism and the electric motor to transmit a torque of the electric motor to the steering mechanism, and in which the plurality of sensors are arranged in a zone where at least two the steering mechanism, the speed reduction device, or the electric motor have therebetween a mechanical linkage through which movement of one member is transmitted to the other member.

3. A power steering device as claimed in claim 2, in which:

the steering mechanism includes a steering shaft that is connected to the steering wheel and a torsion bar that is arranged in a middle part of the steering shaft thereby to connect a steering wheel side of the steering shaft and a steered wheel side of the steering shaft while allowing a relative rotation therebetween;

one of the plurality of sensors is a steering torque sensor that detects a steering torque that is produced in the steering mechanism in accordance with a torsion of the torsion bar;

one of the plurality of sensors is a steering angle sensor that is provided at a steering wheel side relative the torsion bar to detect a rotation amount of the steering shaft;

one of the plurality of sensors is a motor rotation angle sensor that is provided at a steered wheel side relative to the torsion bar to detect a rotation angle of the electric motor;

the detection signal receiving section includes:

a torque signal receiving section that receives two different first and second steering torque detection signals outputted from the steering torque sensor;

a steering angle receiving section that receives two different first and second steering angle signals outputted from the steering angle sensor;

a motor rotation angle signal receiving section that receives two different first and second motor rotation angle detection signals outputted from the motor rotation angle sensor; and a comparison signal production circuit by which a first steering torque calculation signal corresponding to the steering torque is calculated based on the first steering angle detection signal and the first motor rotation angle detection signal and a second torque calculation signal corresponding to the steering torque is calculated based on the second steering angle detection signal and the second motor rotation angle detection signal, and the abnormality judging circuit judges abnormality of the output signals from the steering torque sensor, the steering angle sensor and the motor rotation angle sensor by comparing both the first and second steering torque detection signals and both the first and second steering torque calculation signals respectively.

4. A power steering device as claimed in claim 2, in which:

the steering mechanism includes a steering shaft that is connected to the steering wheel and a torsion bar that is arranged in a middle part of the steering shaft thereby to connect a steering wheel side of the steering shaft and a steered wheel side of the steering shaft while allowing a relative rotation therebetween;

one of the plurality of sensors is a steering angle sensor that is provided at a steering wheel side relative to the torsion bar to detect a rotation amount of the steering shaft;

one of the plurality of sensors is a motor rotation angle sensor that is provided at a steered wheel side relative to the torsion bar to detect a rotation angle of the electric motor;

the detection signal receiving section includes a steering angle signal receiving section that receives two different first and second steering angle detection signals outputted from the steering angle sensor; and a motor rotation angle signal receiving section that receives two different first and second motor rotation angle detection signals outputted from the motor rotation angle sensor, and the abnormality judging circuit judges abnormality of the first and second steering angle detection signals and abnormality of the first and second motor rotation angle detection signals by comparing both the first and second steering angle detection signals and both the first and second motor rotation angle detection signals respectively.

5. A power steering device as claimed in claim 4, in which a comparison signal production circuit is provided for calculating a value corresponding to a rotation amount of the steering shaft by accumulating the first and second motor rotation angle detection signals, and in which:

by comparing the first and second steering angle detection signals and the value corresponding to the rotation amount of the steering shaft, abnormality of the first and second steering angle detection signals and abnormality of the first and second motor rotation angle detection signals are judged.

6. A power steering device as claimed in claim 5, in which a comparison signal production circuit is provided which corrects the first and second steering angle detection signals or the first and second motor rotation angle detection signals based on the torsion amount of the torsion bar and in which the abnormality judging circuit judges abnormality of the first and second steering angle detection signals and abnormality of the first and second motor rotation angle detection signals by comparing the first and second steering angle detection signals and the first and second motor rotation angle detection signals, respectively.

7. A power steering device as claimed in claim 1, in which the common factor is an electric power source circuit that feeds the detection element and the electronic circuits with electric power.

8. A power steering device as claimed in claim 1, in which the common factor is a harness that is connected to the detection element or the electronic circuits.

9. A power steering device as claimed in claim 1, in which the motor control circuit continuously drives and controls the electric motor based on the sensor output signals that have been judged normal by the abnormality judging circuit due to satisfaction of the first and second conditions.

10. A power steering device as claimed in claim 9, in which when, with the plurality of sensor output signals having the abnormal value, the sensor output signals satisfy the first and second conditions, the electric motor is continuously driven and controlled based on both the normality judged sensor output signals and the motor command value whose value is small as compared with a case where the plurality of sensor output signals do not have the abnormal value.

11. A power steering device as claimed in claim 9, in which when, with the plurality of sensor output signals having the abnormal value, the sensor output signals satisfy the first and second conditions, the motor control circuit suppresses the electric motor from being driven and controlled in case where an ignition switch is turned ON after OFF turning of the switch.

12. A power steering device as claimed in claim 9, in which when the plurality of sensor output signals have the abnormal values, the ECU outputs a lamp ON signal for turning ON a warning lamp of the vehicle.

13. A power steering device as claimed in claim 9, in which the ECU is equipped with a non-volatile memory, and in which when the plurality of sensor output signals have the abnormal value, the ECU stores information of the abnormality in the non-volatile memory.

14. The power steering device of claim 1, wherein n is more than one.

15. A control device for a vehicle-mounted equipment which receives sensor output signals from a plurality of sensors that detect an operation condition of a vehicle and controls the vehicle-mounted equipment based on the received sensor output signals, the control device comprising:
  a detection signal receiving section that receives four or more mutually different signals outputted from the plurality of sensors; and
  an abnormality judging circuit that judges abnormality of the sensor output signals by comparing the plurality of sensor output signals, and in which:
    the plurality of sensor output signals are detection signals that are issued from mutually different detection elements or detection signals that are issued from a common detection element and then treated by mutually different electronic circuits,
    when, among groups of the sensor output signals that share a common factor, which is a factor by which the sensor output signals are subjected to change due to a common cause, the number of the signals of the groups to which a maximum number of signals belongs is n, and
    the abnormality judging circuit judges that the sensor output signals are normal when these sensor output signals satisfy first and second conditions and the other sensor output signals are abnormal, the first condition being a condition in which the number of the sensor output signals showing an identical value is the largest, the second condition being a condition in which the number of the sensor output signals is equal to or larger than n+1.

16. A control device for a vehicle-mounted equipment as claimed in claim 15, in which the common factor is the electric power source circuit that feeds the detection element or the electronic circuits with electric power.

17. A control device for a vehicle-mounted equipment as claimed in claim 15, in which the common factor is a harness that is connected to the detection element or the electronic circuits.

18. A control device for a vehicle-mounted equipment as claimed in claim 15, in which the plurality of sensors are arranged in a zone where members that comprise the vehicle-mounted equipment have a mechanical linkage through which movement of one member is transmitted to the other member.

19. A control device for a vehicle-mounted equipment as claimed in claim 15, in which the vehicle-mounted equipment is continuously controlled based on the sensor output signals that have been judged normal due to satisfaction of the first and second conditions by the abnormality judging circuit.

20. A power steering device comprising:
  a steering mechanism that steers the steered road wheels in response to a steering operation of a steering wheel;
  an electric motor that supplies the steering mechanism with a steering force;
  an ECU that drives and controls the electric motor;
  a motor control circuit that is installed in the ECU and outputs a motor command signal for driving and controlling the electric motor in accordance with an operation condition of a vehicle;
  a plurality of sensors that detect a steering condition of the steering mechanism or a driving condition of the electric motor;
  a detection signal receiving section that is installed in the ECU and receives a plurality of sensor output signals, the sensor output signals being mutually different detection signals issued from the plurality of sensors and four and more in number; and
  an abnormality judging circuit that is installed in the ECU and judges abnormality of the sensor output signals by comparing the plurality of sensor output signals,
  in which:
    the plurality of sensor output signals are detection signals that are outputted from mutually different detection elements or detection signals that are detected by a common detection element and treated by mutually different electronic circuits, and
    when, among groups of the sensor output signals that share a common factor, which is a factor by which the sensor output signals are subjected to change due to a common cause, the number of the signals of the groups to which a maximum number of signals belongs is "n",
    the abnormality judging circuit judges that the sensor output signals are normal when these sensor output signals satisfy both a first condition in which the number of the sensor output signals showing an identical value is the largest, and a second condition in which the number of the sensor output signals is equal to or greater than "n+1", and judges that the other sensor output signals are abnormal, and
    when there are no sensor output signals that satisfy the first and second conditions, the abnormality judging circuit judges that the sensor output signals are normal when all of the sensor output signals that do not belong to the group having the largest number of sensor output signals have other sensor output signals whose difference absolute values are larger than a threshold value and whose number is "n", and judges that the sensor output signals that belong to the group having the largest number of sensor output signals are abnormal, and
    when all of the sensor output signals that do not belong to the group having the largest number of sensor output signals whose difference absolute values are larger than the threshold value and whose number is not "n", the abnormality judging circuit judges that the sensor output signals that do not belong to the group having the largest number of sensor output signals and have the largest number of signals showing the identical value are judged normal.

* * * * *